United States Patent
Goldman et al.

(10) Patent No.: US 7,451,135 B2
(45) Date of Patent: Nov. 11, 2008

(54) SYSTEM AND METHOD FOR RETRIEVING AND DISPLAYING INFORMATION RELATING TO ELECTRONIC DOCUMENTS AVAILABLE FROM AN INFORMATIONAL NETWORK

(75) Inventors: Neal Goldman, New York, NY (US); Joseph Einhorn, New York, NY (US)

(73) Assignee: Inform Technologies, LLC, New York, NY (US)

( * ) Notice: Subject to any disclaimer, the term of this patent is extended or adjusted under 35 U.S.C. 154(b) by 275 days.

(21) Appl. No.: 11/151,115

(22) Filed: Jun. 13, 2005

(65) Prior Publication Data
US 2006/0279799 A1    Dec. 14, 2006

(51) Int. Cl.
*G06F 17/30* (2006.01)
(52) U.S. Cl. .................. 707/3; 707/2; 707/4; 707/5
(58) Field of Classification Search .................. 707/2–5
See application file for complete search history.

(56) References Cited

U.S. PATENT DOCUMENTS

| | | | |
|---|---|---|---|
| 5,418,951 A | 5/1995 | Damashek | |
| 5,740,549 A | 4/1998 | Reilly et al. | |
| 5,768,528 A | 6/1998 | Stumm | |
| 6,839,742 B1 | 1/2005 | Dyer et al. | |
| 2003/0225745 A1 | 12/2003 | Goldman et al. | |
| 2005/0114324 A1* | 5/2005 | Mayer | 707/3 |
| 2005/0177805 A1* | 8/2005 | Lynch et al. | 715/968 |
| 2005/0222987 A1* | 10/2005 | Vadon | 707/3 |
| 2006/0106792 A1* | 5/2006 | Patterson | 707/5 |

* cited by examiner

*Primary Examiner*—Etienne P LeRoux
*Assistant Examiner*—Cindy Nguyen
(74) *Attorney, Agent, or Firm*—Amster, Rothstein & Ebenstein LLP

(57) ABSTRACT

A method of displaying information relating to a plurality of electronic documents available from an informational network including the steps of: retrieving information relating to location of each of the plurality of documents available on the informational network; identifying a plurality of elements in each of the plurality of documents, each of the plurality of elements being assigned to a descriptive category selected from a list of descriptive categories; applying a score to each of the plurality of elements in each of the plurality of documents based on relevance of each of the elements to its corresponding document; displaying at least one of the plurality of documents using the retrieved information relating to the location of the plurality of documents on the informational network; for each descriptive category, displaying a list of elements selected from the displayed document that have a score above a predetermined score; and for each element in each of the list of elements, providing a network link to a list of documents in which the element has a score above the predetermined score.

49 Claims, 15 Drawing Sheets

FIG. 8

SYSTEM AND METHOD FOR RETRIEVING AND DISPLAYING INFORMATION RELATING TO ELECTRONIC DOCUMENTS AVAILABLE FROM AN INFORMATIONAL NETWORK

FIELD OF THE INVENTION

The present invention relates to information technology. More particularly, the present invention relates to retrieving, organizing and displaying information relating to electronic documents available on a network

BACKGROUND OF THE INVENTION

Current "on line" informational sources, such as on line newspapers and magazines, do not provide a user an easy means to navigate through a mass of information and quickly view a particular item of interest. Further, these sites typically only display the item of interest, and do not provide secondary material that may be related to the item of interest and which the user may be interested in also viewing. For example, if a user wishes to read a particular article, the user "clicks" on the article and only the article is displayed. However, if the user would like to find articles or related information on one aspect of an article, or read additional articles on the same subject, the user typically must type a keyword into a search engine located at the site, which produces a list of articles having the keyword. This is a tedious task, and often requires the user to sift through a long list of articles to determine relevancy.

Another disadvantage of conventional on line publications is that, in order for a user to read an entire publication or sections of a particular publication, the user must select an article and, after finished reading the article, click the back button and select another article. This two click function, if spread across a large volume of reading, is time consuming, particularly because it requires the loading of multiple pages before an entire section or publication can be read. Also, if a user wishes to read multiple publications, the user must access multiple websites, which is also time consuming. Additionally, each websites uses a different navigation method, and such inconsistency between websites is an impediment to reading large volumes of material quickly. Further, tracking a particular interest is difficult to do online, and typically requires a keyword search. Websites offering a tracking feature typically send material on a particular subject to a user's e-mail, thereby often loading the user's inbox with large volumes of information.

Conventional products which attempt to address the above-mentioned disadvantages include RSS feeders and PDF readers. However, the content of RSS feeders depends on what the publisher chooses to put in the feed, and is typically incomplete. Also, such feeders do not allow a user to track interests or to simply conduct a search relating to elements mentioned in a news article. PDF readers require large file downloads and result in images which are often difficult to read because the size of the screen is typically different from the original publication.

SUMMARY OF THE INVENTION

An aspect of the present invention provides a system and method for displaying information regarding electronic documents available from a variety of online sources, such as online newspapers and magazines, in an ordered format.

Another aspect of the present invention provides a system and method for users to conduct research on a topic of interest mentioned in an electronic document by providing access to other electronic documents and online resources that are related to the topic of interest.

Another aspect of the present invention provides a system and method for users to keep track of a topic of interest on an ongoing basis by providing the user the ability to define which type of electronic documents to be displayed.

Other objects and advantages of the present invention will become apparent from the following description.

A method of displaying information relating to a plurality of electronic documents available from an informational network according to an exemplary embodiment of the invention includes the steps of: retrieving information relating to location of each of the plurality of documents available on the informational network; identifying a plurality of elements in each of the plurality of documents, each of the plurality of elements being assigned to a descriptive category selected from a list of descriptive categories; applying a score to each of the plurality of elements in each of the plurality of documents based on relevance of each of the elements to its corresponding document; displaying at least one of the plurality of documents using the retrieved information relating to the location of the plurality of documents on the informational network; for each descriptive category, displaying a list of elements selected from the displayed document that have a score above a predetermined score; and for each element in each of the list of elements, providing a network link to a list of documents in which the element has a score above the predetermined score.

In at least one embodiment, the step of retrieving a plurality of electronic documents includes eliminating extraneous information from the documents that is not related to the text of the documents.

In at least one embodiment, for each document, the step of identifying a plurality of elements includes determining whether at least one of a plurality of entity names pre-listed in a name catalog appears in the document, the plurality of entity names being pre-categorized in the name catalog based on the plurality of descriptive categories.

In at least one embodiment, the step of determining whether at least one of a plurality of entity names pre-listed in the name catalog appears in the document includes determining whether an alias of at least one of the plurality of entity names appears in the document, the alias being pre-listed along with its associated entity name in the name catalog.

In at least one embodiment, the step of identifying each of the plurality of elements includes identifying at least one entity name by natural language processing.

In at least one embodiment, the method further includes a step of determining whether the at least one entity name identified by natural language processing should be added to the name catalog.

In at least one embodiment, the step of determining whether the at least one entity name identified by natural language processing should be added to the name catalog includes prompting a user to enter the at least one entity name to the name catalog.

In at least one embodiment, the plurality of descriptive categories includes people, places, products or companies.

In at least one embodiment, for each document, the step of identifying a plurality of elements includes identifying at least one element by applying a rule-based algorithm to the document to identify the at least one element.

In at least one embodiment, the at least one element identified using a rule-based algorithm is categorized according to descriptive categories including topics or industries.

In at least one embodiment, the step of applying a score to each of the plurality of elements includes determining a score for each element based on relative position or relative frequency of the element in comparison to other elements in its corresponding document.

In at least one embodiment, the method further comprises a step of grouping the plurality of electronic documents into a plurality of clusters, where the electronic documents in each cluster have at least one common element.

In at least one embodiment, the method further comprises a step of entitling each cluster based on the at least one common element in each cluster.

In at least one embodiment, the method further comprises displaying titles of each cluster and providing corresponding network links to those electronic documents within each cluster.

In at least one embodiment, the method further includes identifying at least one cluster having the most amount of electronic documents as a top story cluster.

In at least one embodiment, the method further comprises displaying the list of documents in which the element has a score above the predetermined score in a knowledge discovery display.

In at least one embodiment, the method further comprises ordering the list of documents in the knowledge discovery display based on credibility, relevance or recentness.

In at least one embodiment, the method further includes identifying a plurality of other elements that appears in the listed documents besides the element.

In at least one embodiment, each of the plurality of other elements is identified based on frequency of appearance in the list of documents or location in each of the documents in the list of documents.

In at least one embodiment, the method further includes displaying a list of the plurality of other elements in a table of contents section of the knowledge discovery display and providing, for each other element, a network link to another knowledge discovery display relating to the other element.

In at least one embodiment, the method further includes ordering the list of the plurality of other elements based on relatedness of each of the plurality of other elements to the element.

In at least one embodiment, the informational network is the Internet.

In at least one embodiment, the plurality of electronic documents are news articles.

According to a processor readable storage medium containing processor readable code for programming a processor to perform a method of displaying information relating to a plurality of electronic documents available from an informational network according to an exemplary embodiment of the invention, the method includes the steps of: retrieving information relating to location of each of the plurality of documents available on the informational network; identifying a plurality of elements in each of the plurality of documents, each of the plurality of elements being assigned to a descriptive category selected from a list of descriptive categories; applying a score to each of the plurality of elements in each of the plurality of documents based on relevance of each of the elements to its corresponding document; displaying at least one of the plurality of documents using the retrieved information relating to the location of the plurality of documents on the informational network; for each descriptive category, displaying a list of elements selected from the displayed document that have a score above a predetermined score; and for each element in each of the list of elements, providing a network link to a list of documents in which the element has a score above the predetermined score.

A computer-based system for displaying information relating to a plurality of electronic documents available from an informational network according to an exemplary embodiment of the invention includes a network interface that communicates with the informational network; a document network location information retrieval system that retrieves information relating to location of each of the plurality of documents available on the informational network; an element identification system that identifies a plurality of elements in each of the plurality of documents and assigns each of the plurality of elements to a descriptive category selected from a list of descriptive categories; an element scoring engine that applies a score to each of the plurality of elements in each of the plurality of documents based on relevance of each of the elements to its corresponding document; and a display generator that generates a user interface on a client computer, the user interface displaying at least one of the plurality of documents using the retrieved information relating to the location of the plurality of documents on the informational network in a user interface, the user interface further displaying, for each descriptive category, a list of elements selected from the displayed document that have a score above a predetermined score and providing, for each element in each of the list of elements, a network link to a list of documents in which the element has a score above the predetermined score.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein:

FIG. 8 shows a name catalog according to an exemplary embodiment of the present invention;

DETAILED DESCRIPTION OF THE INVENTION

Figure 1:
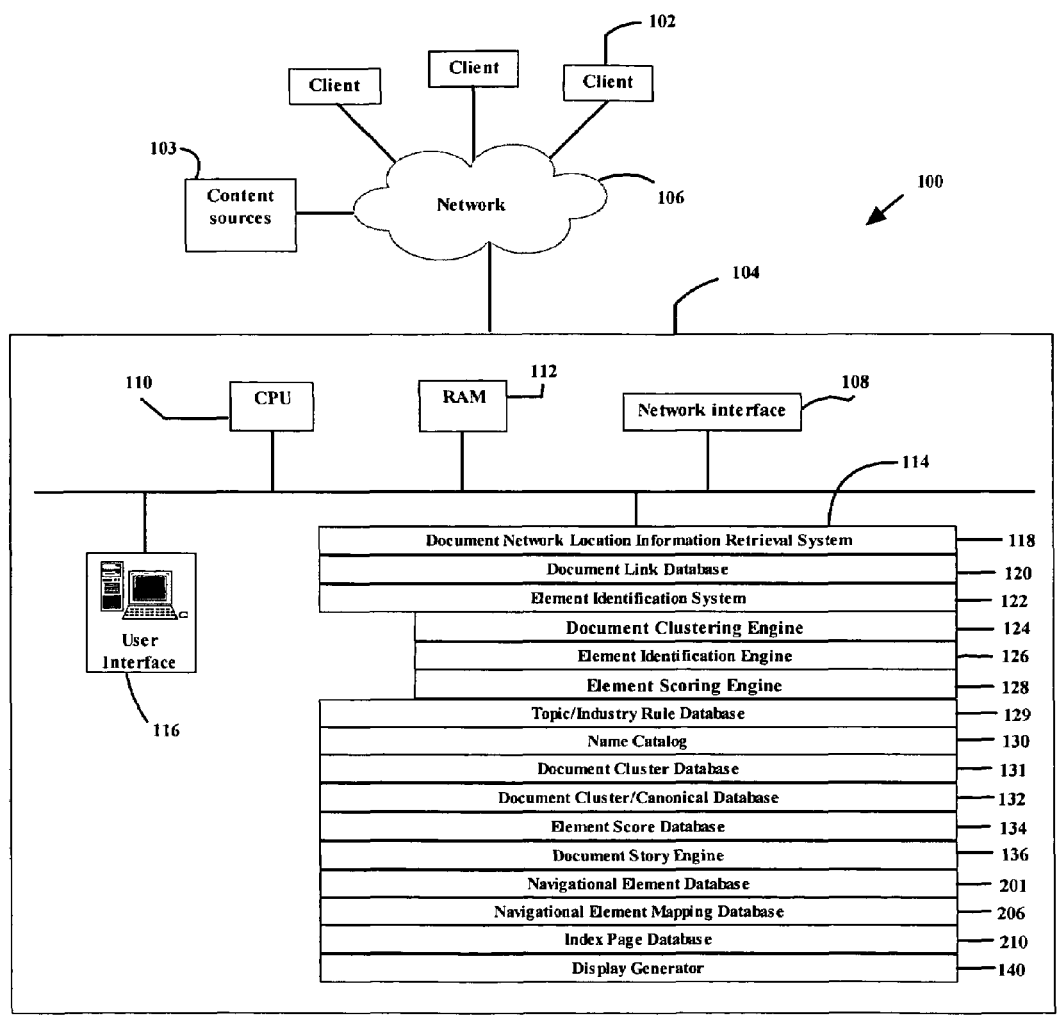
FIG. 1 is a block diagram of a system for retrieving, organizing and displaying information relating to an electronic document available from an informational network according to an exemplary embodiment of the present invention.

FIG. 1 shows a computer-based system 100 for retrieving, organizing and displaying information relating to an electronic document available from an informational network according to an exemplary embodiment of the present invention. In various exemplary embodiments, the electronic documents may be news articles available from a variety of Internet-accessible sources, such as, for example, magazines or newspapers "published" on the Internet, or RSS feeds. Although the present invention will be described herein within the general context of retrieving and displaying news articles available from the Internet, it should be appreciated that the various aspects of the invention may be equally applied to retrieving and displaying any other types of electronic documents, such as any webpage, from a distributed network, such as an intranet, local area network (LAN) or wide area network (WAN). In the following description, the terms "document" and "article" are used interchangeably, although it should be appreciated that an "article" is merely an example of a type of "document"

As shown in FIG. 1, the system 100 of the present invention includes a plurality of client computers 102 connected to at least one server computer 104 over a network 106. A group of client computers 102 may be located within a common LAN and connected to a LAN server. In a preferred embodiment, each of the client computers 102 are connected to the server computer 104 via the Internet. Content sources 103, such as, for example, RSS feeds and electronic publishers, are connected to the network 106.

The server computer 104 includes a network interface 108, a central processing unit 110, a primary memory (i.e., random access memory) 112, a secondary memory 114, and a user interface 116. The network interface 108 is preferably an Internet interface for communication with the client computers 102 via the Internet. The secondary memory 114 is preferably disk storage. Code is stored in the secondary memory for performing a plurality of processes, executable by a processor, which function together to retrieve, organize and display information relating to documents "published" on the Internet. Alternatively, each of the processes may run on a separate hardware element of the server computer 104. Each of these processes will now be described with reference to the flow charts and databases shown in FIGS. 2-10.

Figure 2:
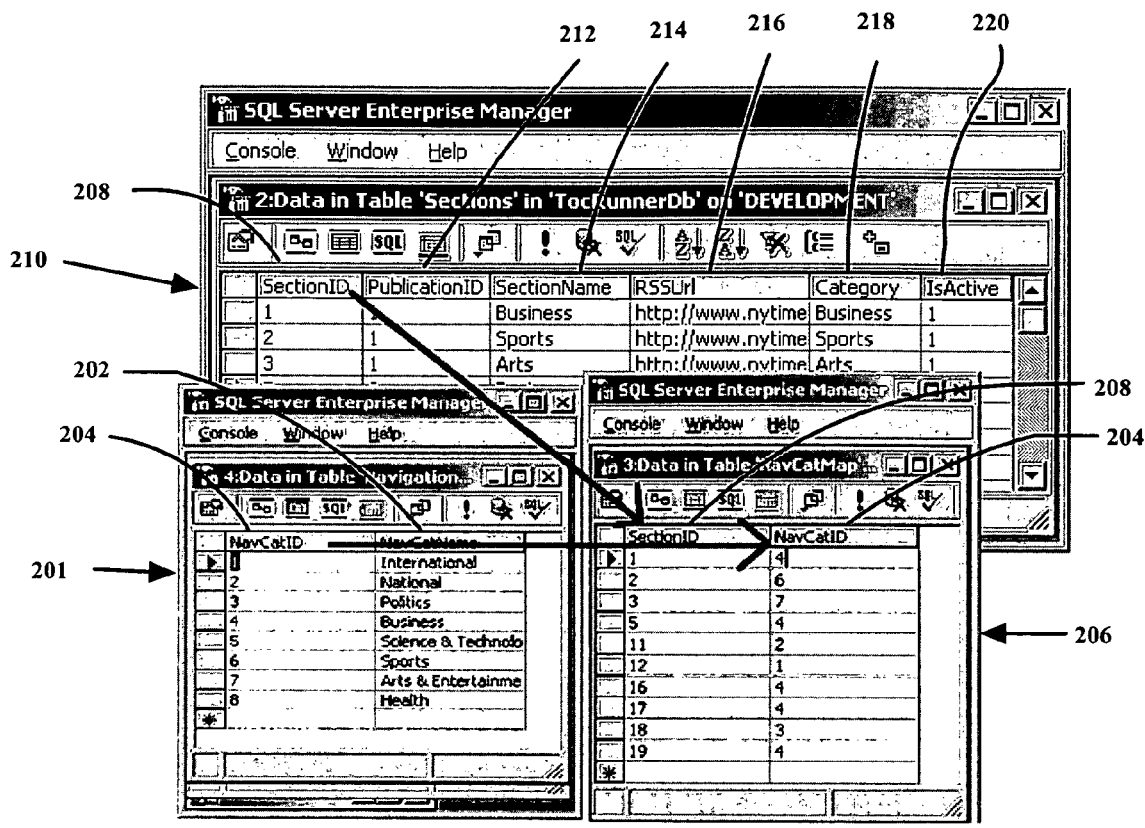
FIG. 2 shows a navigational element database 201 according to an exemplary embodiment of the present invention.

Initially, as shown in FIG. 2, a system administrator compiles a navigational element database 201 which lists navigational elements 202 and corresponding Navigational Element ID numbers 204. For example, database 201 shows International, National, Politics, Business, Science and Technology, Sports, Arts and Entertainment and Health as possible navigational elements, each assigned Navigational Eelement ID numbers 1-8, respectively. The system administrator also compiles, for each publication, a navigational element mapping database 206 which lists sections of a publication by assigning a Section ID 208 to each section, in addition to each section's corresponding Navigational Element ID 204. Thus, for example, as shown in FIG. 2, the business section of the N.Y. Times may be assigned a Section ID of "1" and defined by the "Business" Navigational Element ID of "4". Thus, each section of each publication is essentially mapped to a previously defined navigational element. Using the navigational element database 201 and the mapping databases 206, the system administrator also compiles an index page database 210 which lists publications by corresponding Publication IDs 212, and, for each section in a particular publication, a Section ID 208, a Section Name 214, the section's website address 216 (i.e., URL), the section's Category 218 (which corresponds to the section's corresponding Navigational Element ID), and the sections' active status 220.

In an alternative embodiment of the invention, additional navigational elements 202 may be predefined to create "channels" in a child-parent format. For example, a "politics" channel may have "Republican Party" and "Democratic Party" sub-channels. These navigational element channels may be predefined by choosing navigational topics from a pull-down menu. The pull-down menu may be populated by only those topics that have a minimum amount of content available.

An electronic document network location information retrieval system 118 enters each of the index pages of a publication as databased in the index page database 210 and retrieves the network address and title of each of the documents in the index page. For example, the system 118 is capable of retrieving the URLs of all the news articles within the business section of a newspaper published over the Internet.

Figure 3:
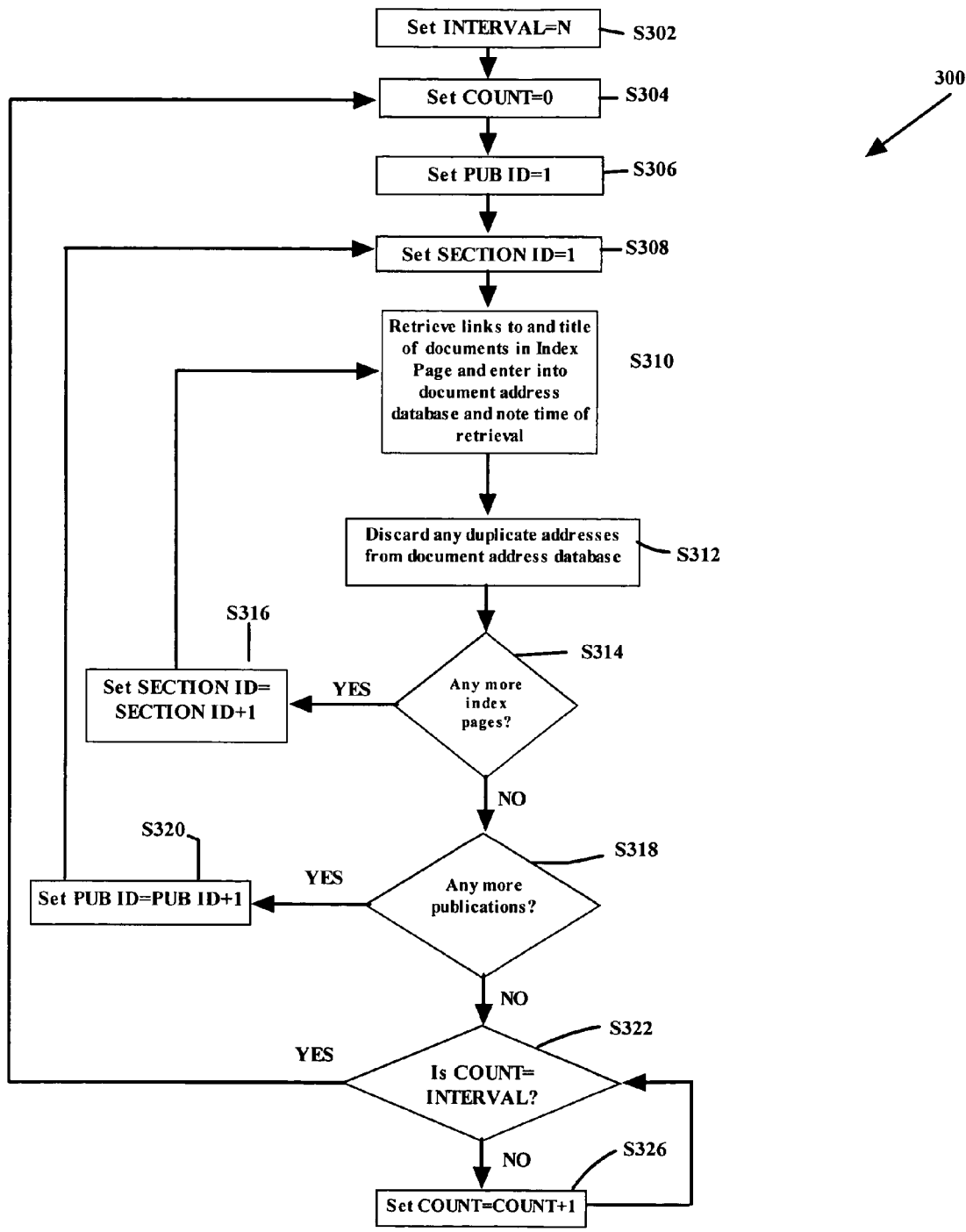
FIG. 3 is a flowchart showing various steps of a process for retrieving information related to documents within index pages of a number of publications according to an exemplary embodiment of the present invention.

FIG. 3 is a flowchart showing the various steps of a process 300 for retrieving information related to documents within index pages of a number of publications, as implemented by the system 118 according to an exemplary embodiment of the invention. In step S302 of the process 300, the interval of time which the system 118 will wait before retrieving new information is set by a system administrator. This is done by setting the variable INTERVAL equal to some number N, where N is the number of hours, minutes or seconds in the interval. Thus, for example, if the system clock of the system 118 is set to run in intervals of minutes and it is desired to wait 15 minutes to retrieve new information, the number N would be set at 15. At step S304, the variable COUNT is set equal to zero. Next, at step S306, the variable PUB ID is set equal to 1, indicating that the system will initially retrieve information relating to the publication assigned a Publication ID 212 of 1 in the index page database 210. Then, at step S308, the variable SECTION ID will be set equal to 1, indicating that the system will initially retrieve information relating to the index page assigned a Section ID 208 of 1 in the index page database 210. Thus, initially, the system 118 will retrieve information relating to the index page assigned a Section ID of 1 in the publication assigned a Publication ID of 1.

Next, at step S310, the system 118 retrieves the link (i.e., URL) and title of each document within the index page and enters this information into the document link database 120. Index pages may include advertisements and other extraneous elements. Thus, the system 118 must be able to discriminate between links to extraneous elements and links to the actual documents of interest. In exemplary embodiments of the invention, the system 118 is able to perform this task by analyzing the source code of the index page to determine where the documents of interest are located on the index page.

The source code may be examined to determine the logic used by the developer that made the page/site to infer how to programmatically identify a link to an article. For instance, sometimes a link will be in a particular font or color, or the area in which the links appear has its own formatting convention that eases the task of determining where to focus code-differentiation. Further, sometimes a publication will include a "tag", which is a specific identifier with no presentation value but rather identifies where a link may exist. Additionally, the storage methodology for an article as compared to that of other types of content is specific and can be used to identify the article link.

At step S312, any duplicate links are discarded from the document link database 120. At step S314, the system 118 determines if there are any more index pages in the publication. If there are more index pages, then the process proceeds to step S316, where the SECTION ID is set equal to SECTION ID+1. The process will then return to step S310, where the links and tides of documents in the next index page is retrieved. In step S314, if it is determined that there are no more index pages in the publication, the process continues to step S318, where the system 118 determines if there are any more publications. If so, then the process continues to step S320, where the PUB ID is set equal to PUB ID+1. The process then returns to step S3308, where the SECTION ID is set back to 1, so that the links and titles of each index page in the next publication can be retrieved. In step S318, if it is determined that there are no more publications, the process continues to step S322, where the system 118 determines whether the variable COUNT is equal to INTERVAL. If COUNT does not equal to INTERVAL, then the process will continue to step S326, where COUNT is set equal to COUNT+1. If COUNT is equal to INTERVAL, meaning that some amount of time N has gone by, then the process returns to step S304, where the variable COUNT is set back to zero. The process repeats in this manner to periodically retrieve the links and titles on each index page of each publication.

It should now be evident that, by iterating through the above process, the system 118 is able to automatically populate the document link database 120 with, for each document, at least a document title and a URL. In this regard, each of the documents is preferably assigned a Document or Article ID for ease of identification. In a preferred embodiment, the date and time of the initial instance that a link is retrieved is also stored in the document link database 120.

Figure 4:
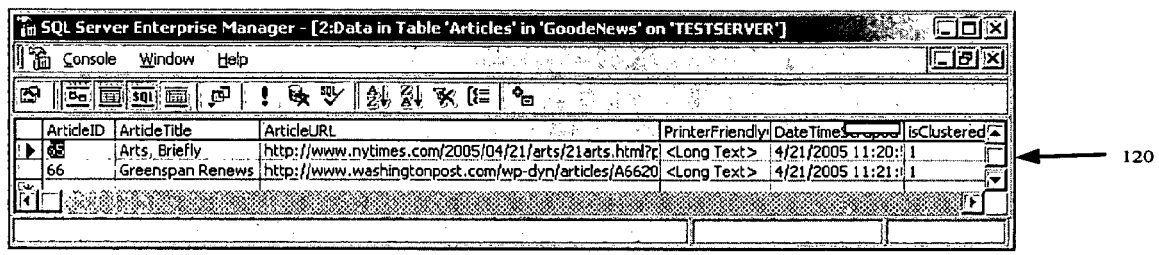
FIG. 4 shows a portion of a document link database according to an exemplary embodiment of the present invention.

The information obtained by the system 118 is preferably stored in a document link database 120. FIG. 4 shows a portion of an exemplary document link database 120, as applied to news articles, including, for each article, an Article ID, an Article Title, the Article URL and the Time/Date of the article. In addition, the document link database 120 preferably includes, for each document, a corresponding category based on the previously mentioned navigational elements, which is the same Category 218 as that assigned to the document's corresponding index page as listed in the index page database 210. Thus, within the context of news articles, the document link database 120 is able to provide a list of articles and their corresponding navigational element.

There may be some instances when an article is included in multiple sections of a publication. Thus, in at least one embodiment of the invention, only one instance of the title, link and elements of a particular article are retained in the document link database 120 and that instance is related to each of the sections in the site in which the article appears.

The above-described process 300 performed by the system 118 can be modified for increased speed and efficiency. For example, in at least one embodiment, the system administrator may assign each publication a priority ranking of 1 to 5, 1 being the most important. When numerous links are available for processing at any one time, the system 118 is able to prioritize link retrieval using the priority rankings. Also, the priority rankings can be used to determine how often links from a particular publication should be retrieved.

Figure 5:
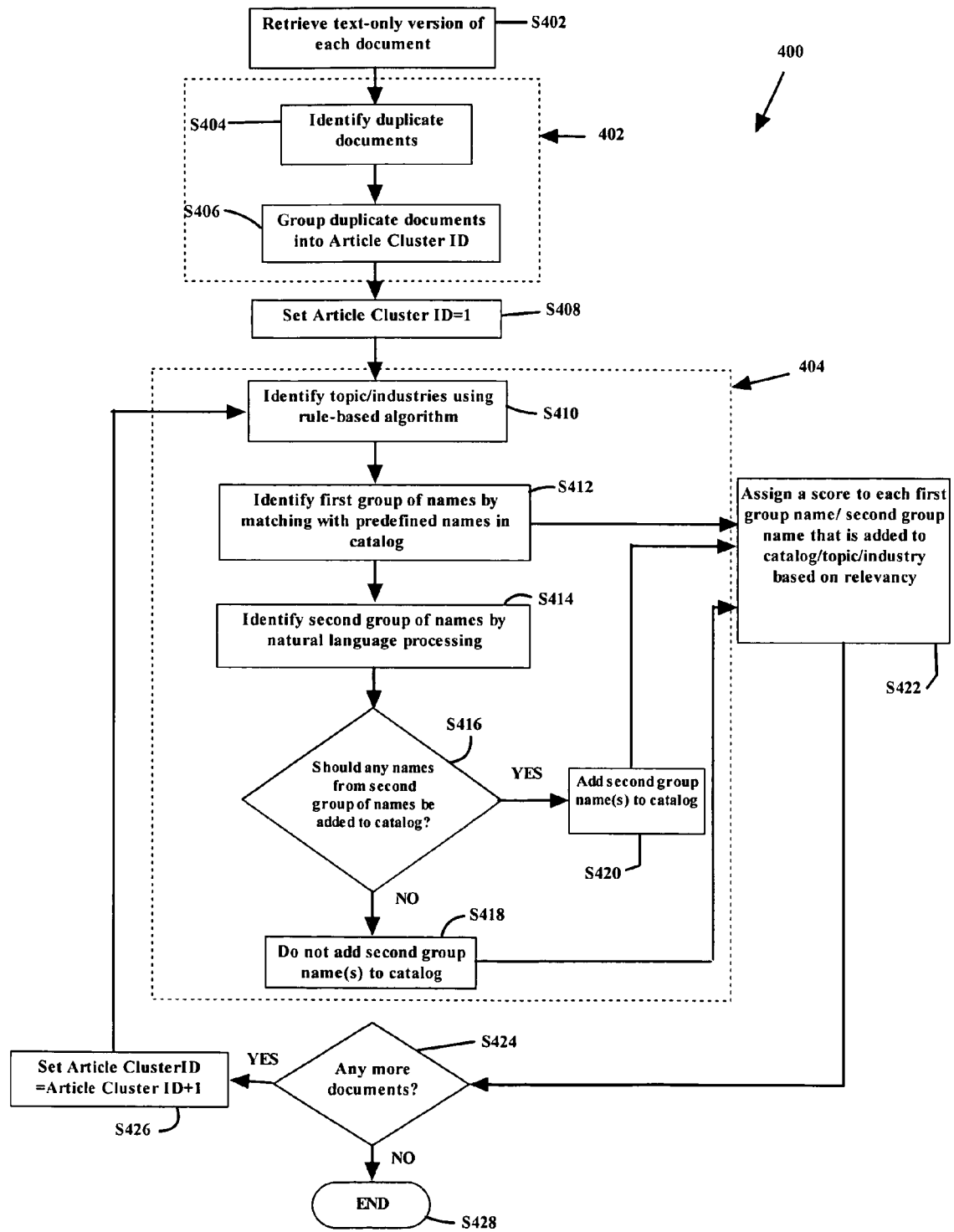
FIG. 5 is a flowchart showing various steps of a process for extracting elements from documents according to an exemplary embodiment of the present invention.

An electronic document element identification system 122 extracts elements from documents and assigns a score to each of the elements based on the element's relevancy to it's corresponding document. FIG. 5 is a flowchart showing a process 400 for extracting elements from documents according to an exemplary embodiment of the invention, as implemented by the element identification system 122. In step S402 of the process 400, a text-only version of each document is retrieved using the document link database 120. For example, in some cases, a link to a "printer friendly" version of the document is available on the document web page. "Printer-friendly" versions of documents are typically text-only. Thus, in step S402, a text-only version of a document may be easily obtained by locating the link to the "printer friendly" version of the document and retrieving the "printer-friendly" version. Alternatively, if there is no "printer-friendly" version of the document, code may be implemented to piece together just the text of the document from the document webpage. An example of such code is provided in Listing 1, shown below:

Listing 1: Exemplary code for retrieving text-only version of a document.

```
private string GetPrintText(string input)
{
   string html="";
   try
   {
      objMatchTag = Regex.Match(input, RegexPrintText,
      RegexOptions.IgnoreCase|RegexOptions.Multiline);
      //Checks for the returned boolean value
      while (objMatchTag.Success)
      {
         //checks for the group containing text.
         Group objTextGroup = objMatchTag.Groups["articletext"];
html = html + objTextGroup.Value.ToString( );
         objMatchTag=objMatchTag.NextMatch( );
      }
      html = Regex.Replace(html, @".*?\(CNN\)\s*?-{2,}", " ",
         RegexOptions.Multiline | RegexOptions.IgnoreCase);
      html = Regex.Replace(html, @"<h\d>(.|\s)*?</h\d>", " ",
         RegexOptions.Multiline | RegexOptions.IgnoreCase);
      html = Regex.Replace(html, @"<i>(.|\s)*?</i>", " ",
         RegexOptions.Multiline | RegexOptions.IgnoreCase);
      html = ParseLib_New.ParseLib.StripAllHtmlTags(html);
      html = ParseLib_New.ParseLib.RemoveSpecialCharacters(html);
   }
   catch(Exception ex)
   {
      Applog.WriteToLog("GetPrintText", "p.aspx.cs", ex.Message);
   }
   return html;
}
```

The code used to retrieve a text-only version of a document is modified based on the publication from which the document is retrieved, since each publication has its own source code. In at least one exemplary embodiment, the code may have the ability to identify tags located at the beginning and end of the text areas of a document.

Figure 6:
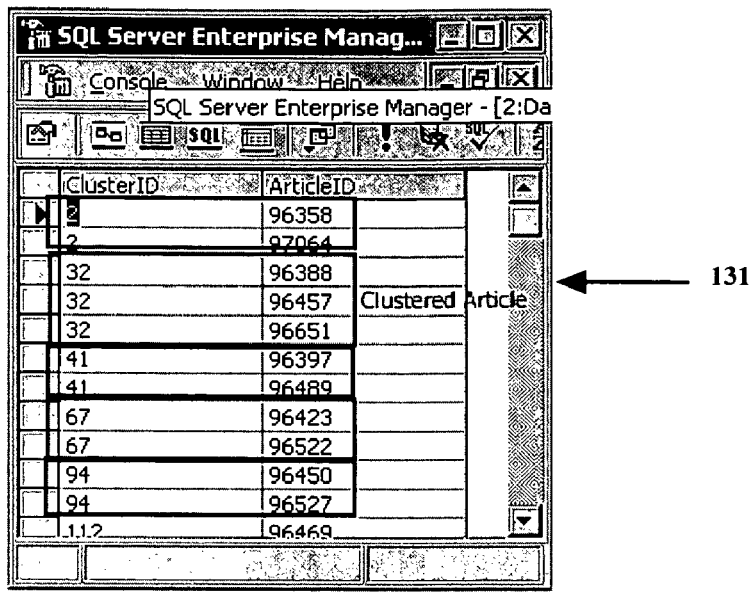
FIG. 6 shows a document cluster database according to an exemplary embodiment of the present invention.

In step S404, duplicate documents are identified using the text-only versions of the documents retrieved in step S402. This step is necessary because, in the case of news articles, many publications run the same article due to their use of the same Associated Press or United Press content. The system 122 may include an electronic document clustering engine 124 which implements this step. Preferably, clustering engine 124 runs a rule-based comparison algorithm 402 to identify duplicate documents. For example, in one embodiment of the invention, if at least some percentage of words in the first two sentences of a document are the same as those in the first two sentences of another article, than the clustering engine 124 determines that the two article are the same. In step S406, the clustering engine 124 groups identical publications into clusters, and assigns a Document Cluster ID to each cluster of publications. Each document's Document ID and Document Cluster ID may then be entered into the electronic document cluster database 131, as shown in FIG. 6.

In step S408, the Document Cluster ID is set equal to 1, meaning that the process 400 initial runs using the document cluster having a Document Cluster ID of 1. The process 400 then continues to steps S410-S420, in which an element identification engine 126 identifies elements in the document cluster by implementing an element identification process 404. For the purposes of the present description, the term "element" should be interpreted to encompass an entity name appearing within a document cluster as well as a particular topic or industry mentioned in a document cluster. For example, an element may be "NBA", "Michael Jordan", and "Chicago Bulls", which are entity names, or "Basketball", "Sports", "All-Stars", which are topics/industries.

Figure 7:
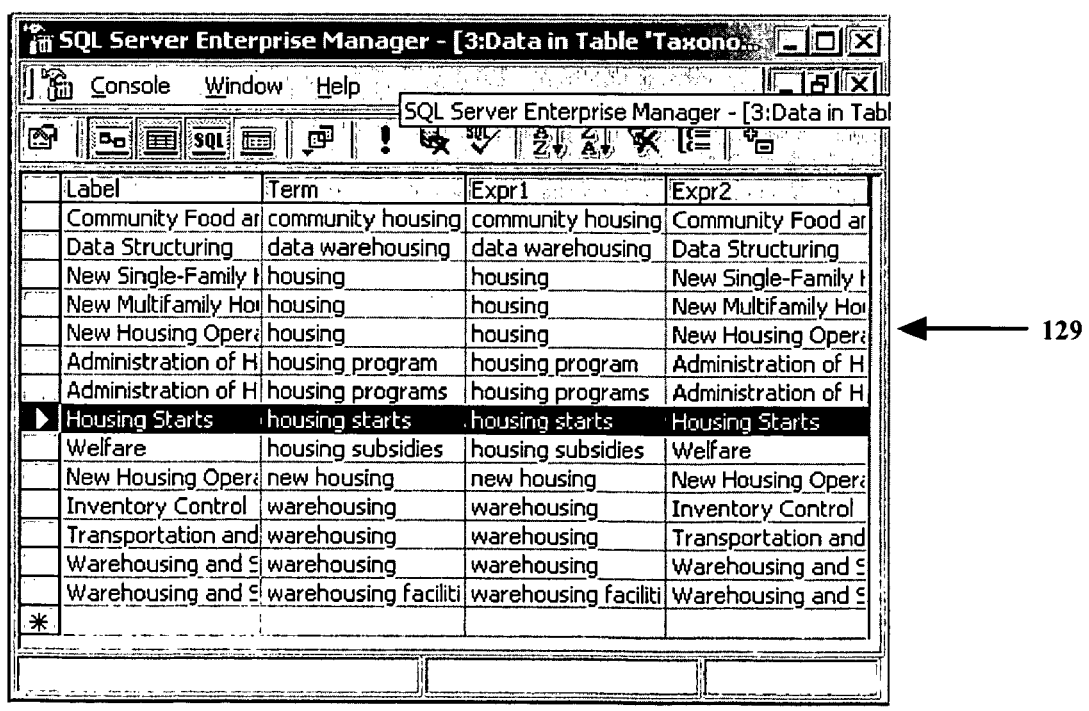
FIG. 7 shows a topic/industry rule database according to an exemplary embodiment of the present invention.

In step S410, topic/industry elements are identified in the document cluster. This step may be implemented using a rule-based algorithm. For example, topics and industries may be identified using a set of rules such as: 1) "must include any of the following words . . . "; 2)" must include the following word string . . . "; 3) must not include any of the following words . . . "; 4) must not include the following word string . . . "; 5) match case; 6)" a word . . . must appear within X words of the word . . . ", etc. Thus, numerous topics and industries may be predefined based on a set of rules, and the topics and industries and their corresponding rule elements may be listed in a topic/industry rule database 129, as shown in FIG. 7. The element identification engine 126 refers to the topic/industry rule database 129 to identify any topic/industry elements in the document cluster.

Figure 8:
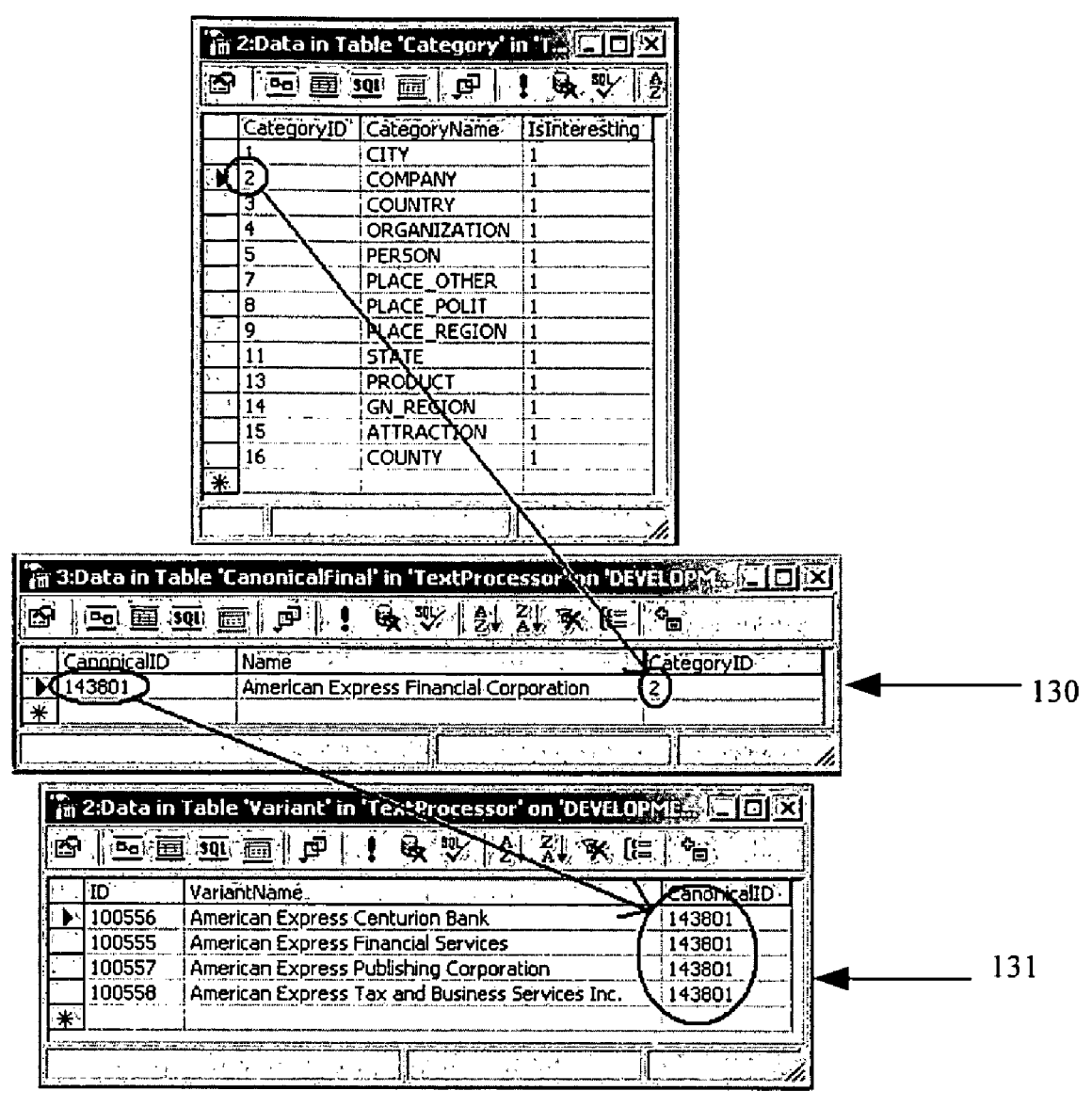

The process 400 then continues to step S412, where the element identification engine 126 identifies a first group of entity name elements. This step may be implemented by referring to a pre-populated name catalog to determine if any of the entries in the name catalog appear in the document cluster. FIG. 8 shows a name catalog 130 useable with an exemplary embodiment of the present invention. The name catalog 130 includes a list of canonical names, aliases, or variations, of the canonical names, an Element Category ID, and a Canonical ID. The list of canonical names and aliases, and their corresponding Element Category IDs and Canonical IDs are entered into the name catalog 130 manually by a system administrator. The Element Category ID identifies the particular category to which the canonical entity name relates. For example, the entity name may be matched to one of the following categories: 1) Person; 2) Company; 3) Places; and 4) Product, where each of the categories is assigned an Element Category ID. In the example shown in FIG. 8, the canonical entity name "American Express Financial Corporation" is assigned to the Element Category ID of "2", which indicates that this canonical entity name is categorized as a Company. The Canonical IDs identify the canonical entity names by identification numbers. The Canonical IDs are also matched with variants, or aliases, of corresponding canonical entity names in an alias catalog 131. For example, as shown in FIG. 8, the alias catalog 131 may include aliases of the canonical entity name "American Express Financial Corporation", such as, for example, "American Express Centurion Bank", "American Express Financial Services", etc. Each one of the aliases is also assigned a corresponding alias ID, as shown in the alias catalog 131.

After step S414, the process 400 continues to step S416, where a second group of entity names is identified by natural language processing (NLP). In this regard, the element identification engine 126 may recognize sentence structure to identify this second group of entity names. Suitable NLP software used to perform this step is commercially available from, for example, Inxight, of Sunnyvale, Calif.

The process then continue to step S416, where it is determined whether any of the entity names identified by NLP should be added to the name catalog 130. Preferably, this step is accomplished by prompting the system administrator to perform one of the following tasks: 1)create a new entity name entry in the name catalog 130 by entering a canonical name based on the name found by NLP and defining some aliases; 2) add the name found by NLP to the name catalog 130 as an alias to an already-existing canonical entity name; or 3) discard the found name as an inappropriate addition to the name catalog 130. The element identification system 122 preferably has the ability to suggest aliases of a found canonical entity name using a database of synonyms of first names, company names, etc., such as "William"="Bill"="Will" and "Corporation"="Corp.". If it is determined that an entity name identified using NLP should be added to the name catalog 130, the entity name is added to the name catalog 130 at step S420.

In an embodiment of the invention, the element identification engine 126 may place elements identified by NLP into a queue so that the user can later review the identified elements for possible inclusion in the name catalog 130. Further, the element identification engine 126 may use certain rules to automatically eliminate certain elements found by NLP. For example, the following types of elements may be discarded: 1) one word names; 2) company names that consist of one word which matches the first word of any of the other elements identified in the same article; or 3) an element used in a certain context that does not appear to be consistent (e.g., if "Clinton" is identified as a place in an article in which "William Jefferson Clinton" has already been identified, then "Clinton" may be eliminated.)

After the element identification system 126 identifies elements in a document cluster, the process proceeds to step S422, where an element scoring engine 128 assigns a score to each of the identified elements. The score of each element is based on the element's relevancy to its corresponding document cluster, which depends on a variety of factors. For example, a score assigned to an entity name may depend on how many other entity names appear in the document cluster, how many times each name entity was mentioned in the document cluster, and the length of the documents making up the document cluster. A formula using these factors may be used to determine a relevancy score for each entity name element. An example of such a formula may be O/M, where O=the number of occurrences of a particular canonical and M=the number of occurrences of all canonicals of the same type. Thus, if a person is mentioned 5 times and the total number of "people mentions" is 10, the person would receive a relevance score of 0.5. Alternatively, a score may be computed by calculating O/M', where M'=occurrences of all elements of all types (people, companies, places, products) added together, so now O's score lessens the more things (in general) are mentioned in the article.

The relevancy score assigned to a particular topic/industry element may be obtained by weighting the rules used to identify the topic/industry. A formula may then be used that takes into account which rules were satisfied in identifying the topic/industry element and the weight of each rule. Suitable scoring formulas using these factors are known from, for example, software available from Inxight, particularly Inxight Smart Discovery Version 4.1.

At step S424, it is determined whether there are any more document clusters. If so, then the process 400 continues to step S426, where Article Cluster ID is set equal to Article Cluster ID+1, meaning that elements will then be identified in the next article cluster using the name catalog 130, rule-based topic/industry algorithm and NLP. Otherwise, the process ends at step S428.

Figure 9:
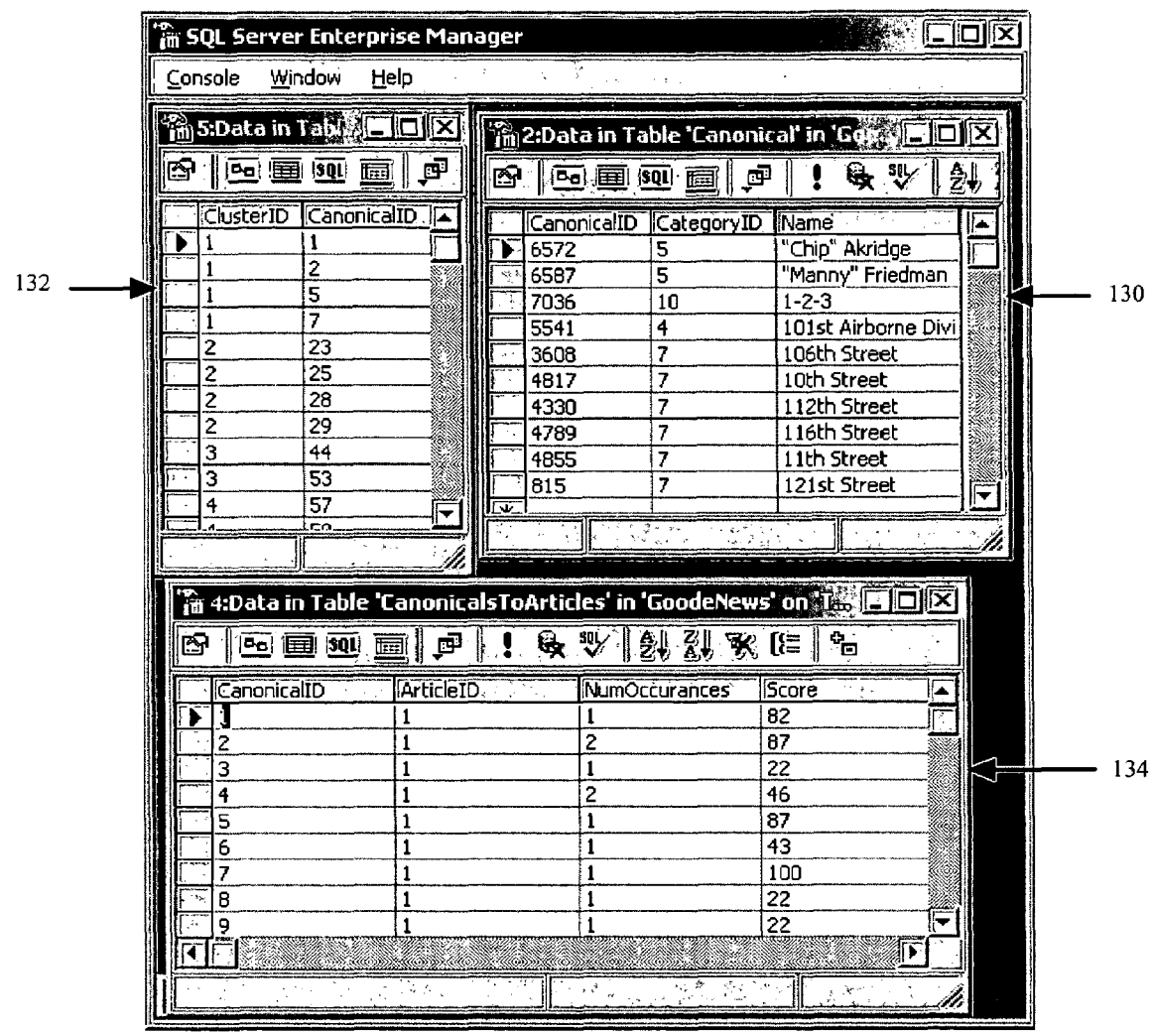
FIG. 9 shows an element score database according to an exemplary embodiment of the invention.

It should be evident that, by iterating through the process 400, each document cluster can be matched to an element identified in the document cluster. For example, FIG. 9 shows a document cluster/canonical database 132 that lists document clusters identified by Article Cluster IDs along with Canonical IDs matching the name entities identified in the document clusters. The database 132 can then be used in conjunction with the name catalog 130 and the document cluster database 131 to generate an element score database 134, as shown in FIG. 9. The element score database 134 may list, among other things, the Article ID corresponding to each document, along with the entity name elements appearing in each document, the number of occurrences of each entity name element in each document, and the score of each entity name element in each document.

In an alternative embodiment of the invention, duplicate articles may be determined after all the elements are identified in all the articles retrieved by the system 104. For example, if each article in a group of articles have the same or similar elements, and those same or similar elements have the same or similar score, then those articles may be grouped under a single article cluster. In other words, if each article in the group of articles contain similarly scored elements, then it can be assumed that those articles are identical.

Figure 10:
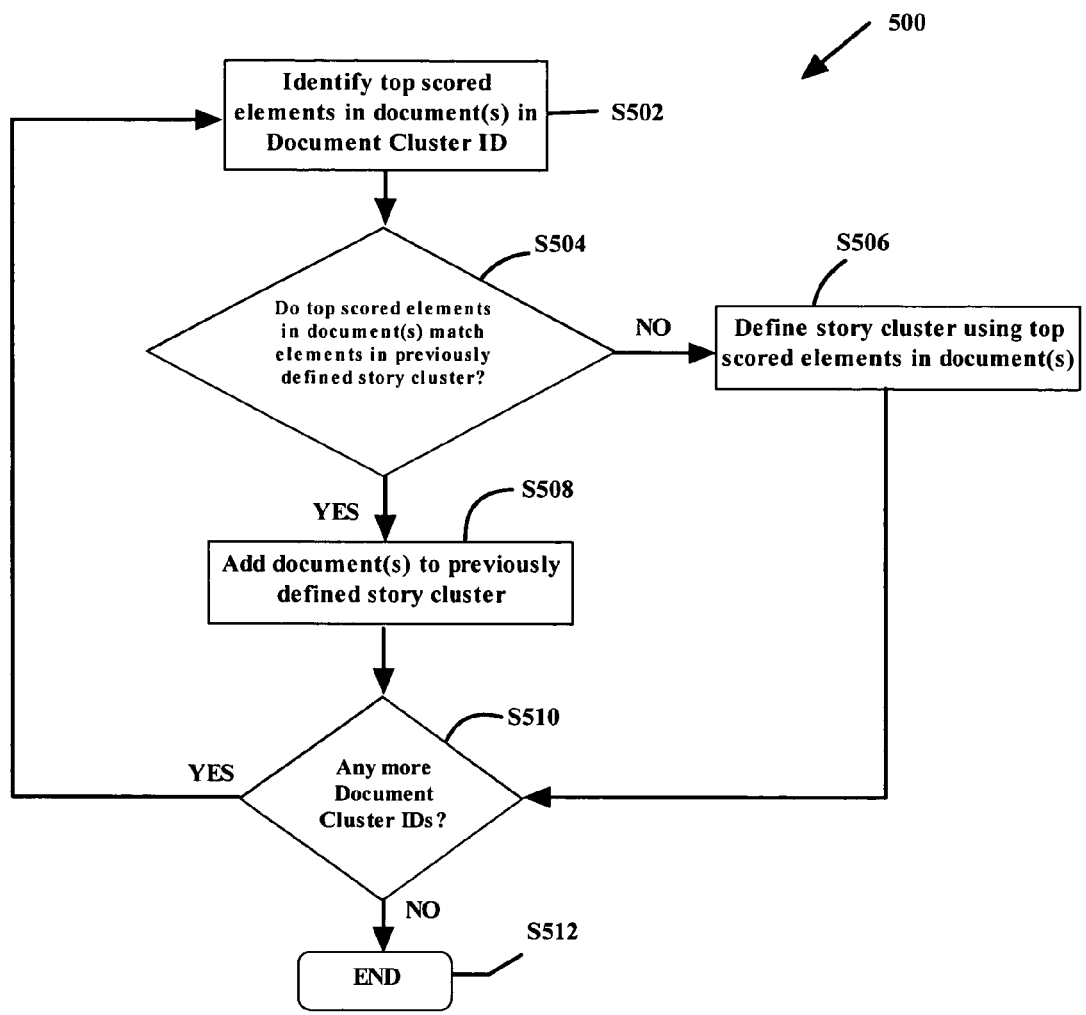
FIG. 10 is a flowchart showing various steps of a process for clustering documents to form stories according to an exemplary embodiment of the present invention.

An electronic document story engine 136 "clusters" related documents to form "stories". Story clusters may include, for example, multiple instances of different press covering the same news item. For example, if the documents are news articles, a number of the news articles may be commonly related to "Iraq" "oil" and "gasoline prices", in which case these news articles may be grouped under a story identified by the common elements. FIG. 10 shows a process 500 for clustering documents to form stories according to an exemplary embodiment of the invention, as implemented by the document story engine 136. In step S502 of the process 500, the top scored elements in a document cluster is identified using the element score database 134. For example, elements in the document cluster having a score above a predetermined score may be identified as "top" elements in step S502. In step S504, where it is determined whether the top scored elements in the document cluster match the elements which define a previously generated story cluster. If so, the document cluster is added to the previously defined story cluster at step S508. Otherwise, a new story cluster is generated and defined using the top scored elements in the document cluster at step S506. At step S510, it is determined whether there are any more document clusters. If so, the process 500 returns to step S502, where the top scored elements in the next document cluster are identified. Otherwise, the process 500 ends at step S512.

It should be evident that, by iterating through the process 500, any number of story clusters can be generated which are made up of document clusters and defined by the top elements in the document clusters. The story cluster having the most documents may be considered a "top story". Thus, for example, under each navigational element, the top stories may be listed first and duplicate stores may be eliminated.

Figure 11:
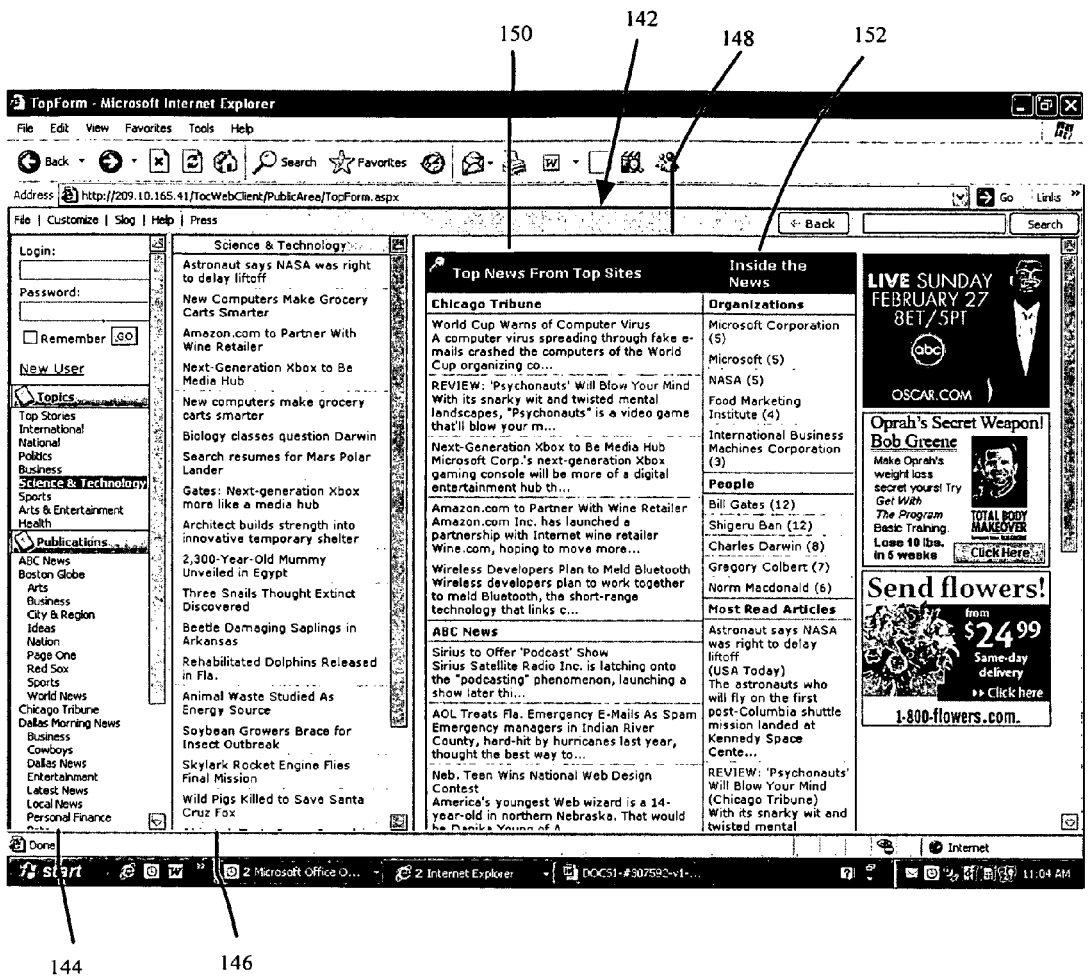
FIG. 11 is a screenshot of a main navigational page according to an exemplary embodiment of the present invention configured with a navigational element selected.

A display generator 140 uses the variety of information regarding the publications and documents retrieved and stored in the databases discussed above to generate navigational screens for viewing by a system user at a client computer 102. For example, FIG. 11 shows a main navigational page 142. The main navigational page 142 includes a first sidebar 144 that provides a list of "Topics" and "Publications". The "Topics" list includes "Top Stories" along with each of the previously mentioned navigational elements 202. The "Publications" list includes a list of selected publications, such as, for example, ABC News, Boston Globe, etc. A second sidebar 146 is disposed adjacent to the first sidebar 144. The contents of the second sidebar 146 depends on the users selection from the list of "Topics" and "Publications". For example, if the user selects the "Science & Technology" navigational element from the "Topics" list, the second sidebar 146 is generated with a title of "Science & Technology" and populated with a list of articles related to this category using the document link database 120. That is, the display generator 140 retrieves the titles of all documents in the document link database 120 that fall under the "Science & Technology" category, and displays the titles in the second sidebar 146, as shown in FIG. 11. A hyperlink to each document is provided using the URLs of the documents listed in the document link database 120.

Similarly, if a user selects the "Top Stories" navigational element, the second sidebar 146 is generated with a title of "Top Stories". Articles from the story clusters having the most amount of article clusters are preferably listed in the "Top Stories" sidebar. Which articles are chosen to represent each "top story" in the list may be controlled by the system administrator. For example, only the first article that forms each "top story" cluster may be included, only the most recent article in each "top story" cluster may be included, or only articles from a particular publication in each "top story" cluster may be included.

Figure 12:
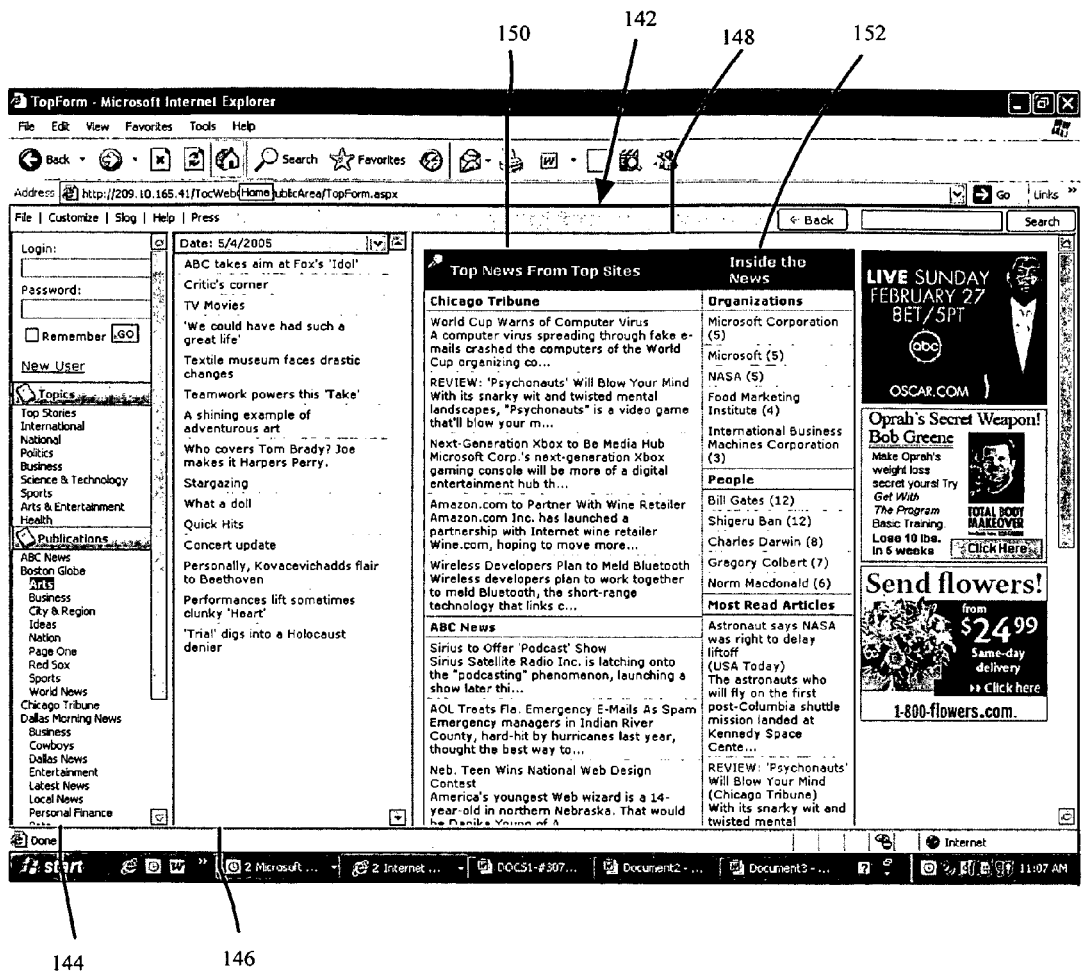
FIG. 12 is a screenshot of a main navigational page according to an exemplary embodiment of the present invention configured with a publication selected.

If a user selects one of the publications from the first sidebar 144, a submenu appears below each publication listing which allows the user to further select a particular section of the publication. Once the user selects a section of a publication, the display generator 140 retrieves all the articles in the particular section using the document link database 120 and displays the title of each document in the second sidebar 146. For example, as shown in FIG. 12, the user has selected the "Arts" section of the Boston Globe in the first sidebar 144, and thus the second sidebar 146 displays all the articles from this particular section.

The main navigational page 142 also provides a main display section 148 that initially includes a first main display sub-section 150 entitled "Top News From Top Sites" and a second main display sub-section 152 entitled "Inside the News". The first main display sub-section 150 lists the articles from particular publications that are related to the navigational element selected by the user. For example, if the user selects "Science & Technology", for each particular publication, the display generator 140 may retrieve the titles and first few words of the articles related to this category using the document link database 120 and displays the titles in the first main display sub-section 150. A hyperlink to each document is provided using the URLs of the documents listed in the document link database 120. Which publications to be listed in the first main display sub-section 150 may be chosen by the system administrator. In this regard, a publisher may pay a fee for their publication to be listed in the first main display sub-section 150, and/or pay a fee for their publication to be listed at the top of the list.

The second main display sub-section 152, entitled "Inside the News", provides an indication of which elements are appearing most in today's news. The system 14 may review all the articles under a particular navigational element, and determine the most frequently mentioned elements. The "Inside the News" section displays these elements, along with a count of how many times they appear and, for each element, a link to all articles that mention the element. In an embodiment of the invention, a section of the main display 148 may provide a list of the most popular articles, which may be determined by tracking the number of times articles are selected for viewing. In this regard, the system 104 may maintain an activity log for each user.

Figure 13:
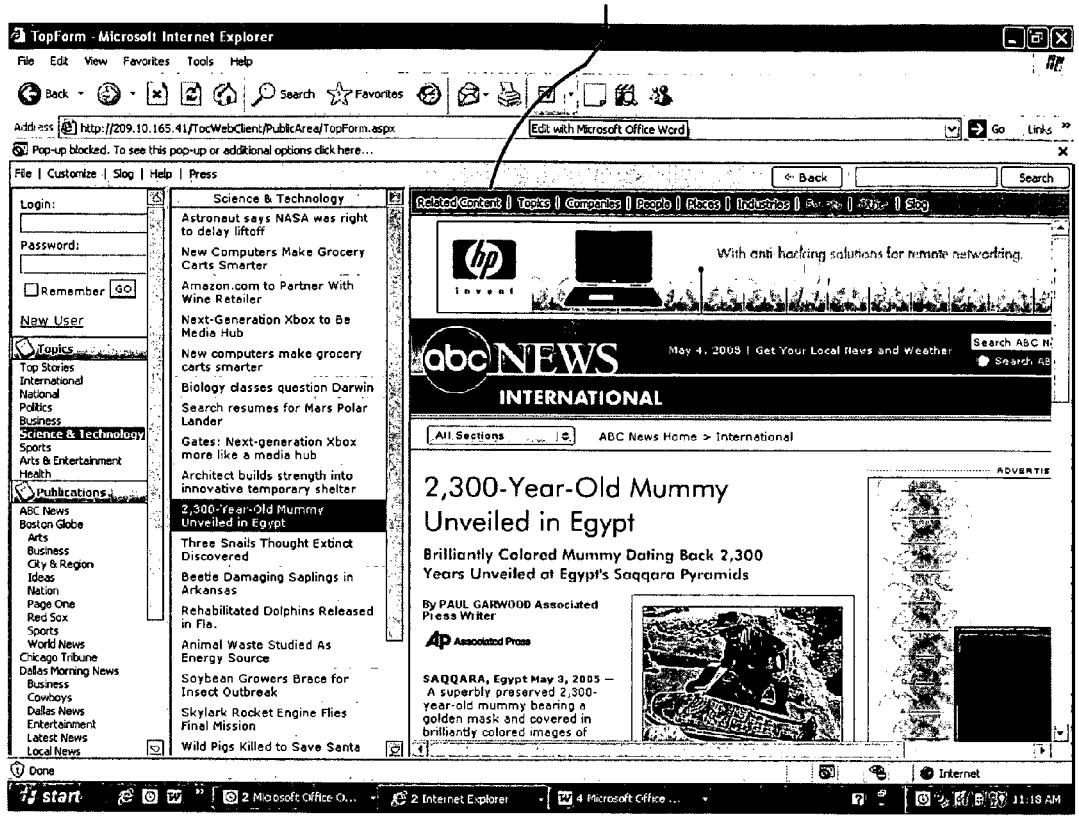
FIG. 13 is a screenshot of a main navigational page according to an exemplary embodiment of the present invention configured with an article selected for viewing.
Figure 14:
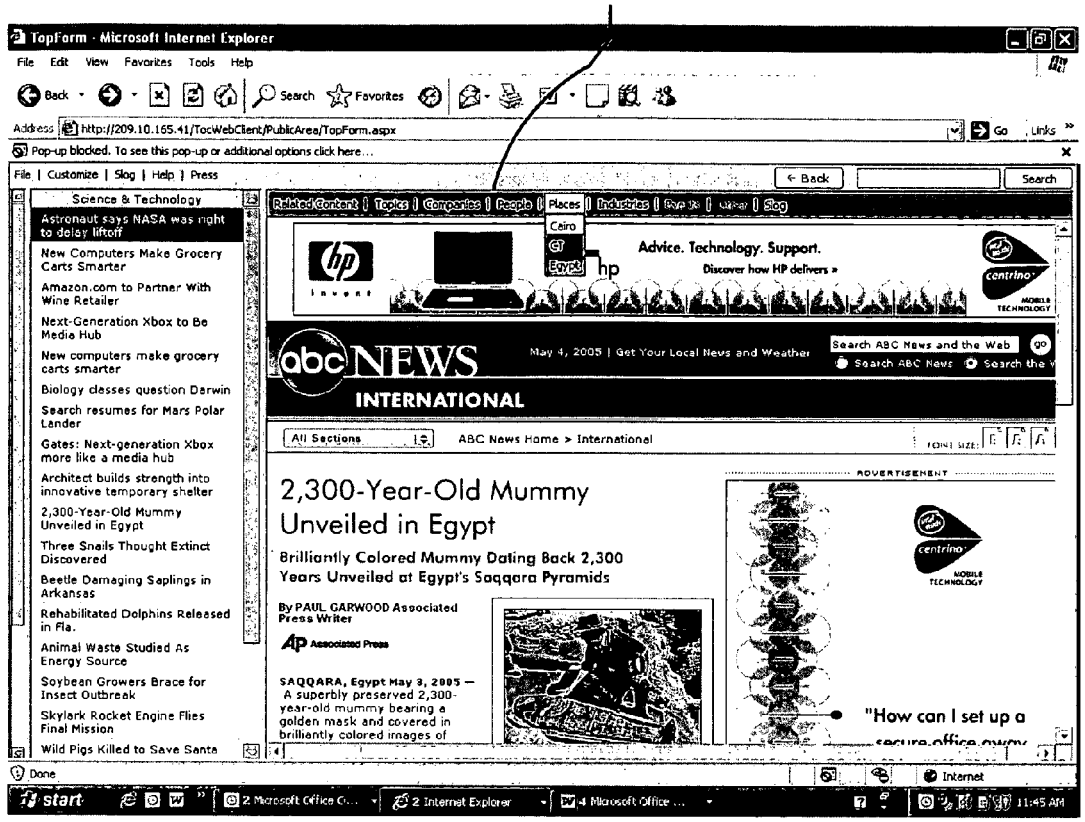
FIG. 14 is a screenshot of a main navigational page according to an exemplary embodiment of the present invention configured with an element pull-down menu selected.

When a user selects any one of the articles in the second side bar 146, first main display sub-section 150 or second main-display sub-section 152, the display generator 140 retrieves the article using the URL listed in the document link database 120, and displays the article in the main display section 148. For example, as shown in FIG. 13, the user has selected the article entitled "2,300-Year-Old Mummy Unveiled in Egypt" in the second sidebar 146, and thus the main display section 148 now displays the full text of that article. Pull-down menus 154 are provided above the article within the main display section 148. A pull-down menu 154 is provided for each element category (i.e., "Topics", "Industries", "People", "Places" and "Companies"). The element category pull-down menus 154 are populated using the element score database 134. For example, as shown in FIG. 14, when a user selects the "Places" pull-down menu, a list of elements in the article categorized as a "place" is provided using the element score database 134. In this particular example, the entity name elements "Cairo", "CT" and "Egypt" appear in the article, and thus these elements are listed in the "Places" pull-down menu. In at least one embodiment of the invention, only the elements having a score above a predetermined score is listed in each pull-down menu.

A "Related Content" button 156 may also be provided above the article within the main display section 148. Selecting the "Related Content" button results in a display of a list of articles and corresponding links that are similar to the currently viewed article. For example, the system 104 may determine that another article is similar to the currently viewed article if the elements in the other article match a certain percentage of the top elements in the currently viewed article.

Figure 15:
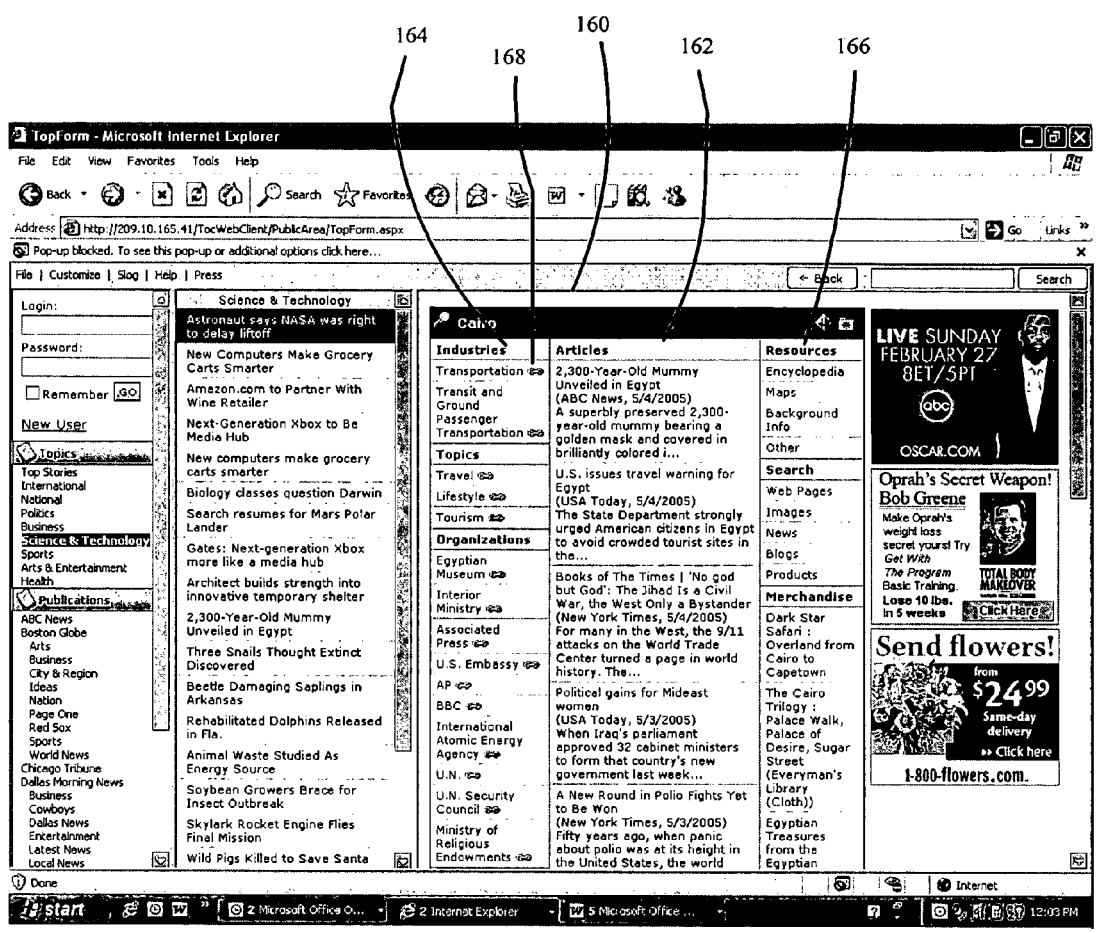
FIG. 15 is a screenshot of a knowledge discovery display according to an exemplary embodiment of the present invention.

As shown in FIG. 15, when a user selects one of the elements from a pull-down menu, a knowledge discovery display 160 appears in the main display section 148. The knowledge discovery display is preferably entitled with the element of interest selected from the pull-down menu 154. Thus, as shown in FIG. 15, since the user has selected "Cairo" for further knowledge discovery, the knowledge discovery display 160 is entitled "Cairo". The display generator 140 retrieves articles which include the element of interest using the information provided in the element score database 134 and populates the knowledge discovery display 160 with the titles of and corresponding hyperlinks to the articles. These related articles may be listed under a related articles section 162 of the knowledge discovery display 160, as shown in FIG. 15. Also, using the time/date listed in the document link database 120 in conjunction with the element score database 134, the display generator 140 may select only the articles that are dated within a specified time frame and which include the element of interest. An example of code that may be implemented to retrieve articles within a specified time frame and which include an element of interest is provided below in Listing 2.

Listing 2: Exemplary code for retrieving articles dated within specified time period and which include element of interest.

```
CREATE PROCEDURE dbo.FasArticlesRelatedToCanonical
@CanID int
AS
declare @count int
set @count = (select count (distinct documentId) from Entity where CanonicalID = @CanID)
if (@count > 15)
    begin
        set @count= (select count(distinct documentId) from Entity where CanonicalID = @canID and relevance > 85 )
        if (@count> 15)
        begin
            print 'Good results'
            select top 15 Identifier,Title, DateAdded, PublicationName, Substring(ArticlePrinterFriendlyContent,1,100) AS Subtext
            from document,Articles,Sections,Publications where Articles.SectionID=Sections.SectionID AND
            Sections.PublicationID=Publications.PublicationID AND Articles.ArticleID=Document.Identifier AND DocumentID in
                (select Distinct top 30 documentID from Entity where CanonicalID=@CanID and
                relevance >85 order by DocumentID desc)
                and Title not in (
                select distinct Title from document where DocumentID in
                (select Distinct top 30 documentID from Entity where CanonicalID=@CanID and
                relevance >85 order by DocumentID desc) group by (title) having count(tide) > 1)
                ORDER BY Identifier DESC --Jack
        end
    else
        begin
            print 'semi good results'
            select top 15 Identifier, Title,DateAdded,PublicationName, Substring(ArticlePrinterFriendlyContent,1,100) AS Subtext
            from document,Articles,Sections,Publications where Articles.SectionID=Sections.SectionID AND
            Sections.PublicationID=Publications.PublicationID AND Articles.ArticleID=Document.Identifier AND DocumentID in
                (select Distinct top 30 documentID from Entity where CanonicalID=@canID order by
```

-continued

```
DocumentID desc)
       and Title not in (
       select distinct Title from document where DocumentID in
       (select Distinct top 30 documentID from Entity where CanonicalID=@CanID
       order by DocumentID desc) group by (title) having count(title) > 1)
       ORDER BY Identifier DESC --Jack
```

The order of articles related to the element of interest listed in the knowledge discovery display 160 may be determined using an algorithm that uses a variety of factors, such as, for example, recentness of the article, credibility of the source, and whether a publisher pays a fee for higher placement of the article on the list. The importance of an article to a user is correlated to the credibility of the source. Publications and/or authors may be tiered into different levels of credibility. Credibility may be determined by, for example, (i) the system administrator's decision as to what is credible, (ii) publicly available circulation or readership statistics and/or (iii) user ratings, which may be aggregated through a feedback mechanism on the site. Formula 1, provided below, may be used to determine the order of displayed articles.

Article Order = [(Recentness)(Weight)] + [(Relevance)(Weight)] + [(Article Credibility)(Weight)]     (1)
Recentness = 10 − {(#hours old individual article) [(base value of 10) / (#hours oldest article in subset published)]}
Relevance = 10 − {(confidence value of individual article) [(base value of 10) / (lowest confidence value in subset of articles)]}
Credibility = 10 − {(tier) [(base value of 10) / (total # of tiers)]}
X = Standard deviation threshold
Y = Number of articles to be displayed in the menu bar
Z = Minimum confidence value All articles with a relevance value of >X standard deviations from the mean are displayed. The order in which the articles are displayed is determined by using Formula 1, so that the article with the highest article order score is listed first. If <Y number of articles are displayed, the top Y articles will be displayed unless article values dip below Z confidence value. The list of entities can also be manually resorted by recentness, relevance or credibility. The credibility score for publications which pay for placement may be increased in order to surface the articles from those publications to the top of the list.

In an embodiment of the invention, the order of articles may be determined using a "step down" function, where, for example, the system 104 first determines those articles in which the element of interest has a relevance score equal to 100, and then determines those articles in which the element of interest has a relevance score equal to 99, and so on. In order to minimize computing time, the system 104 may be programmed to stop searching for additional articles after a certain number of articles are found which have a score equal to a predetermined score.

The knowledge discovery display 160 also includes a table of contents section 164. The table of contents section 164 provides a list of elements besides the element of interest that appear in the list of articles provided in the related articles section 162. The display generator 160 retrieves the elements in the related articles using the element score database 134, determines the top elements in each category, and displays the top elements organized by category in the table of contents section 164. In the example shown in FIG. 15, the display generator 160 determined that the elements "Travel", "Lifestyle" and "Tourism" are the top elements in the related articles, and thus these elements are listed under the category of "Topics". An element may be determined to be a top element in the collection of related articles based on various factors, such as, for example, prevalence of the element in the articles, and where the element appears in the articles. An exemplary code used to determine a top element is provided below as Listing 3.

Listing 3: Exemplary code for determining a top element.

```
@CanID int
AS
DECLARE @iDocID int
DECLARE @MyCursor CURSOR
DECLARE @rc1 int
DECLARE @count int
DECLARE @relevance int
SET @relevance =85
DECLARE @status int
set @status=0
DECLARE @numResults int
set @numResults=10
SET @MyCursor = CURSOR FAST_FORWARD
FOR
SELECT DISTINCT TOP 9 DocumentID FROM Entity
WHERE CanonicalID=@CanID AND Relevance > 65
ORDER BY DocumentID DESC
OPEN @MyCursor
FETCH NEXT FROM @MyCursor
INTO @iDocID
CREATE TABLE #tmpResults1(CanonicalID int, DocumentID int)
   WHILE (@@FETCH_STATUS = @status)
   BEGIN
      INSERT INTO #tmpResults1
      SELECT DISTINCT CanonicalID, DocumentID
      FROM Entity WHERE DocumentID=@iDocID AND Relevance >
      @relevance AND CanonicalID <> @CanID AND
CategoryID in (9,17,12,20,22,19)
```

In an embodiment of the invention, the relatedness of an element to a selected element may be based on, for example, the frequency with which both elements appear together in articles, the recentness of the article in which the two elements appear and the relevance of the two entities to the articles in which they appear. The method for determining the order of displaying the related elements in the table of contents section 164 may be based on Formula 2, provided below.

Element Order = [(Article 1)(Average relevancy value * weight)(recentness of article * weight)] + [(Article 2)(Average relevancy value * weight) (recentness of article * weight)] + [(Article 3)(Average relevancy value * weight)(recentness of article * weight)]...     (2)
Recentness = 1 − {(#hours old individual article) [(base value of 1) / (#hours oldest article in subset published)]}
A = Relevancy value for evaluating entities
B = Number of entities to be displayed
C = Lowest acceptable relevancy value The subset of articles containing the selected element and all other elements having a relevancy value over A are evaluated. If the number of elements with a relevancy value over A is less than B, then the relevancy value will drop to a minimum of C until B elements are obtained. Formula 2 is then used to determine the element order for each element that appears with the selected element in a number of articles. The top B or less elements are then displayed in the table of contents section 164.

The knowledge discovery display 160 may also include a related links section 166 that provide links to third party resources. The related links section 166 may include, for example, links to research resources such as encyclopedias and maps, links to search pages, and links to merchandise related to the element of interest. In this regard, the element of interest is preferably automatically supplied as an input to the third party resource, so that in the above example, when a user selects the "Maps" link, for instance, the system 100 may link the user to the map resource, which then displays a map of Cairo.

Figure 16:
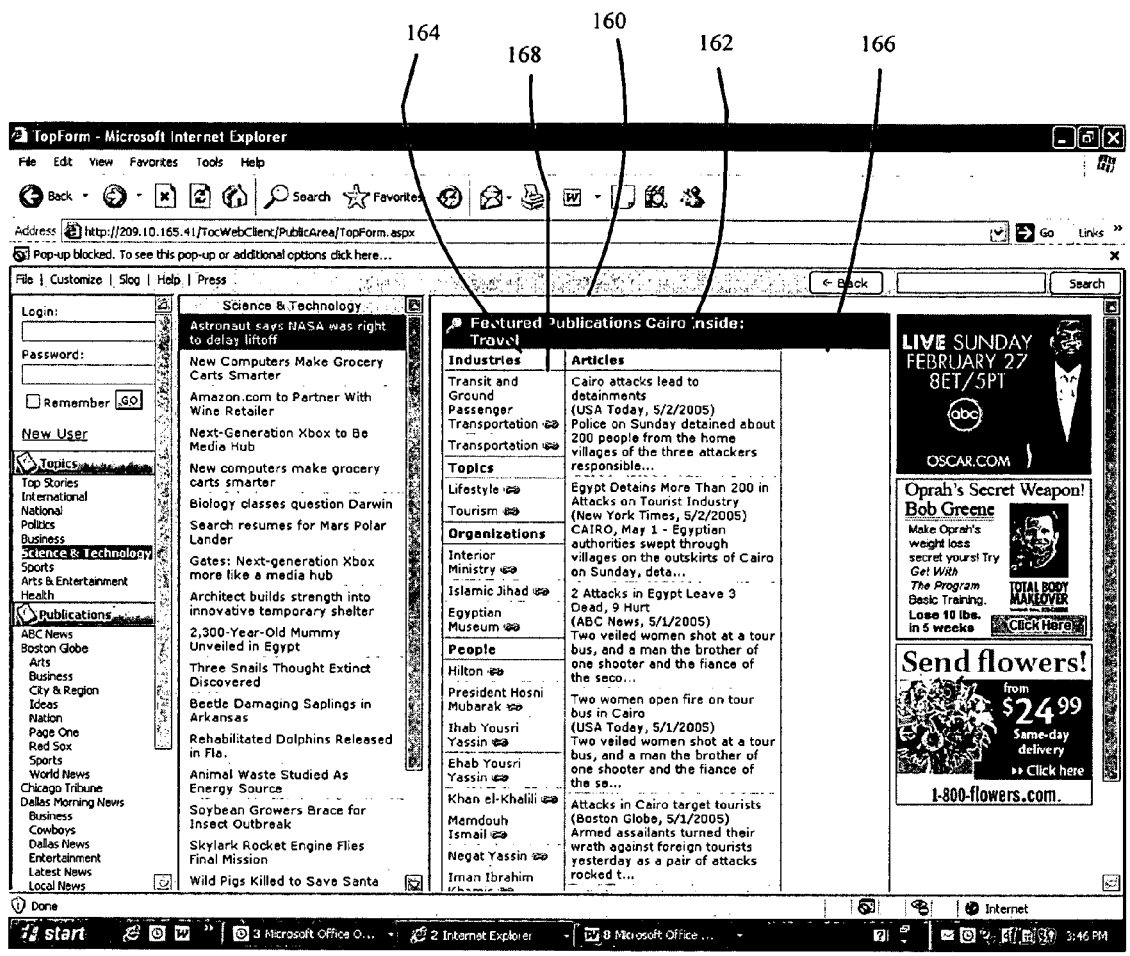
FIG. 16 is a screenshot of a knowledge discovery display according to an exemplary embodiment of the present invention showing linked elements of interest.

The knowledge discovery display 160 may also allow the user to "link" the element of interest with elements in the table of contents section 164 of the knowledge discovery display 160 to generate another knowledge discovery display screen relating to the linked elements. In this regard, a link symbol 168 may be provided adjacent to each of the elements in the table of contents section 164. In order to link the element of interest with another element in the table of contents section 164, the user selects the link symbol 168 next to the element in the table of contents 164. In the above example, for instance, if the user selects the link symbol 168 adjacent to the "Travel" element in the table of contents section 164, the display generator 140 generates a new knowledge discovery display 160 based on the linked elements of interest, "Cairo" and "Travel", as shown in FIG. 16. This new knowledge discovery display 160 then allows the user to view articles related to the new linked elements of interest, link the linked elements of interest to other elements in the new table of contents section 164, and have access to third party resources related to the linked elements of interest.

Based on the above description, it should be apparent that a user is able to perform top level research on a topic by, for instance, simply viewing the information and documents provided in the knowledge discovery display 160 for the topic, or more in-depth research by, for instance, linking the topic to other topics in the table of contents section 164 or by accessing third party resources. Thus, the system 100 allows a user to easily perform guided research on a particular topic by providing access to various related topics and by displaying ordered documents related to the particular topic. In at least one exemplary embodiment of the invention, the user is given control over the type of content that is displayed in the knowledge discovery display 160. For example, a radio control button may be provided to allow the user to select from "editorialized content", "blog content" or "both". If the user selects "blog content", for instance, only blogs related to the element of interest are displayed in the knowledge discovery display 160, and the table of contents section 164 is updated accordingly. In another embodiment, the user can select how to reorder or view subsets of documents. For example, the user may choose to order the documents by relevance or based on date. Further, the user may be provided the ability to limit the documents shown to only those retrieved from publication to which the user subscribes.

The system 100 may be modified to provide additional features, which may be accessible to a user by logging in using a login ID and password, for example. As an example, a user of the system 100 may "subscribe" to web publications. The index page database 210 may be used to power the subscription engine, so that a user can select any combination of sections and publications. For example, the user may select the Business and the Sports section of the New York Times and the Marketplace section of the Wall Street Journal. Based on the users selections, an inbox may be provided for the user that provides the documents from the index pages of interest.

Also, a user may create and/or subscribe to interest "channels", which provide links to documents related to the particular interest on a regular basis. In this regard, interests can be identified by (i) the user choosing a pre-defined channel such as "Exotic Travel" or "Golf", (ii) the elements of interest selected in a knowledge discovery display 160 (which creates a channel based on the elements of interest) or (iii) the user "building" a channel from scratch. When building a channel from scratch, for instance, the user may input a keyword, and the system 100 then suggests all of the already "codified" elements that the user might be referring to using the aliases and definitions in the name catalog 130 and topic/industry rule database 130. It is advantageous for the user to then select an element for inclusion rather than running a keyword search so that all of the rules and aliases will be used in finding content of interest for the user. For example, a user wishing to set up a channel for Bill Clinton is given the opportunity to also select the canonical William Jefferson Clinton for inclusion in the channel, which would result in inclusion of all other aliases of the canonical, such as William Clinton, President Clinton, etc.

The interest channels may also be used to enhance the users experience in other ways. When the user is logged in but not looking at an interest channel, the user's reading experience may be prioritized based on the user's predefined interest channel. For example, if the user is looking at the Business section of the NY Times (as a subscribed publication), the background of an article may be shaded red if the article also happens to match the criteria the user has entered for one of their interest channels. Additionally, other articles that may be of interest to the user based on (i) topics related to the user's interest channels, (ii) topics related to the articles viewed by the user in the past, (iii) other user activities, such as previous knowledge discoveries initiated by the user or articles forwarded by the user, or (iv) which articles or topics other users with similar interests as the user have read, forwarded or otherwise taken in interest in, may be shaded pink, suggesting that these articles are less relevant than those with a red background but likely more relevant than those with a regular white background.

As an example of another feature, a user of the system 100 may have the ability to set up community channels in order to re-distribute content. For example, a user may select articles as they are discovered for inclusion in a community channel. The user may then add a comment to the article or author an article for posting to the community channel. The user's community channel may be assigned a personal web address, so that the user may in essence maintain and publish a personalized publication that relates to a topic of interest. Alternatively or additionally, the community channel may have an RSS feed associated with it, so that other users of the system, or users of a third party RSS reader, may have the community channel pushed to their inbox. Further, multiple users may have the ability to contribute to the same community channel.

The system 100 also provides unique opportunities in behavioral targeting. For example, by tracking a user's use of the system 100, a profile of the user's interests may be generated. Tracking opportunities for a user exist, for example, when the user initially signs up for a login and password, when the user subscribes to publications and interest channels, when the user selects elements of interest from the knowledge discovery display 160 and when the user saves and forwards articles. The user's behavior may be tracked over an extended period of time and stored on servers. Conventional "cross publication" behavioral targeting methods typically use cookies which are stored on the user's computer. This is sub-optimal because users (i) often have multiple computers, (ii) delete their cookies frequently, (iii) may be in work environments that do not allow computers to record cookies and (iv) change their computers from time to time. The information tracked by the system 100 can be used to highlight content of interest for each user (i.e. create a customized online news experience without much effort on the part of the user) and finely target each user for advertising placement. All the data regarding the user's interests may be maintained in a database and used to indicate which documents and/or elements may also be of interest to the user. For example, certain documents and/or elements may be highlighted with another color, indicating that these elements may also be of interest. Data stored in the database may be deleted after a certain period of time if the user has not indicated any further interest in a particular item. Further, the relationship between elements/items in the database generally can be used to suggest items. Such relationships may be created manually (e.g. Odessa is inside Ukraine so interest in Odessa might indicate interest in Ukraine) or by virtue of statistical analysis of the relationships in the database (e.g. Hank Greenberg and AIG are heavily correlated, so interest in Hank Greenberg would suggest an interest in AIG).

The system 100 also provides advantages in ad placement. Whereas some publications (such as the New York Times) and sections (such as Travel) are more valuable for advertisement placement, the system 100 provides advertisement value that is equal to or even greater than that of the original publication. For example, a user reading a NY Times article relating to "exotic travel" on the system 100 may decide to conduct further research on "exotic travel in New Zealand", thereby narrowing down the user's particular interest beyond just "exotic travel" and providing a highly-valued placement opportunity for an ad relating to New Zealand tourism.

The system 100 also allows for delivery to a publisher a database of tagged elements that appear in their articles, as the articles are published. The publisher can then use this metadata to make their article page more of a "hub" for the user of their website. For instance, a publisher can use the information that an article is about "tennis" and "Anna Kournikova" to draw right links on the page such as Upcoming Tennis Matches, List of Ranked Tennis Players, Anna Kournikova's Tennis Record, Pictures of Anna Kournikova and a classified ad for US Open Tickets for Sale. These links enhance the publisher's revenue by providing, for example, a fee based service to the end-user, access to web pages which may provide additional ad placement opportunities, access to web pages which may sell an item for which the publisher shares in the revenue and a more valuable user experience which engenders long-term loyalty.

The system 100 further allows for delivery to a publisher a drop-down menu feature which can be inserted into the publisher's articles. For example, the drop-down menu feature may include categories such as People, Places, Companies, etc., such that when a particular category is chosen, the system 100 can be used to populate the drop down menus. When the user selects an element in the drop-down menu, the system 100 can then return data to the publisher that can be used by the publisher to create additional pages. These additional pages may include lists of articles from that publisher that are related, lists of articles from any selection of publishers that are related, such as other publications under common ownership or of a specific credibility characteristic, or lists of articles from all publishers. The data provided by the system 100 may also be used by the publisher to generate pages similar to the table of contents section 164. Pin-point feeds based on any of the elements in the system 100 may also be delivered to redistributors, thereby allowing them to use the data to populate specific areas of their site.

While the foregoing invention has been described in some detail for purposes of clarity and understanding, it will be appreciated by one skilled in the art from a reading of the disclosure that various changes in form and detail can be made without departing from the true scope of the invention in the appended claims.

What is claimed is:

1. A method of displaying information relating to a plurality of electronic documents available from an informational network, comprising:

retrieving information relating to location of each of the plurality of documents available on the informational network;

identifying a plurality of elements in each of the plurality of documents, each of the plurality of elements being assigned to a descriptive category selected from a list of descriptive categories;

applying a score to each of the plurality of elements in each of the plurality of documents based on relevance of each of the elements to its corresponding document;

displaying at least one of the plurality of documents using the retrieved information relating to the location of the plurality of documents on the informational network;

for each descriptive category, displaying a list of elements selected from the displayed document that have a score above a predetermined score; and for each element in each of the list of elements, providing a network link to a list of documents in which the element has a score above the predetermined score.

2. The method of claim 1, wherein the step of retrieving a plurality of electronic documents comprises eliminating extraneous information from the documents that is not related to the text of the documents.

3. The method of claim 2, wherein, for each document, the step of identifying a plurality of elements comprises determining whether at least one of a plurality of entity names pre-listed in a name catalog appears in the document, the plurality of entity names being pre-categorized in the name catalog based on the plurality of descriptive categories.

4. The method of claim 3, wherein the step of determining whether at least one of a plurality of entity names pre-listed in the name catalog appears in the document comprises determining whether an alias of at least one of the plurality of entity names appears in the document, the alias being pre-listed along with its associated entity name in the name catalog.

5. The method of claim 3, wherein the step of identifying each of the plurality of elements comprises identifying at least one entity name by natural language processing.

6. The method of claim 5, further comprising a step of determining whether the at least one entity name identified by natural language processing should be added to the name catalog.

7. The method of claim 6, wherein the step of determining whether the at least one entity name identified by natural language processing should be added to the name catalog comprises prompting a user to enter the at least one entity name to the name catalog.

8. The method of claim 3, wherein the plurality of descriptive categories comprises people, places, products or companies.

9. The method of claim 2, wherein, for each document, the step of identifying a plurality of elements comprises identifying at least one element by applying a rule-based algorithm to the document to identify the at least one element.

10. The method of claim 9, wherein the at least one element identified using a rule-based algorithm is categorized according to descriptive categories comprising topics or industries.

11. The method of claim 1, wherein the step of applying a score to each of the plurality of elements comprises determining a score for each element based on relative position or relative frequency of the element in comparison to other elements in its corresponding document.

12. The method of claim 1, further comprising a step of grouping the plurality of electronic documents into a plurality of clusters, where the electronic documents in each cluster have at least one common element.

13. The method of claim 12, further comprising a step of entitling each cluster based on the at least one common element in each cluster.

14. The method of claim 13, further comprising displaying titles of each cluster and providing corresponding network links to those electronic documents within each cluster.

15. The method of claim 14, further comprising identifying at least one cluster having the most amount of electronic documents as a top story cluster.

16. The method of claim 1, further comprising displaying the list of documents in which the element has a score above the predetermined score in a knowledge discovery display.

17. The method of claim 16, further comprising ordering the list of documents in the knowledge discovery display based on credibility, relevance or recentness.

18. The method of claim 16, further comprising identifying a plurality of other elements that appears in the listed documents besides the element.

19. The method of claim 18, wherein each of the plurality of other elements is identified based on frequency of appearance in the list of documents or location in each of the documents in the list of documents.

20. The method of claim 19, further comprising displaying a list of the plurality of other elements in a table of contents section of the knowledge discovery display and providing, for each other element, a network link to another knowledge discovery display relating to the other element.

21. The method of claim 20, wherein the another knowledge discovery display is related to the other element and the element.

22. The method of claim 20, further comprising ordering the list of the plurality of other elements based on relatedness of each of the plurality of other elements to the element.

23. The method of claim 1, wherein the informational network is the Internet.

24. The method of claim 23, wherein the plurality of electronic documents are news articles.

25. A processor readable storage medium containing processor readable code for programming a processor to perform a method of displaying information relating to a plurality of electronic documents available from an informational network, the method comprising the steps of:

retrieving information relating to location of each of the plurality of documents available on the informational network;

identifying a plurality of elements in each of the plurality of documents, each of the plurality of elements being assigned to a descriptive category selected from a list of descriptive categories;

applying a score to each of the plurality of elements in each of the plurality of documents based on relevance of each of the elements to its corresponding document;

displaying at least one of the plurality of documents using the retrieved information relating to the location of the plurality of documents on the informational network;

for each descriptive category, displaying a list of elements selected from the displayed document that have a score above a predetermined score; and for each element in each of the list of elements, providing a network link to a list of documents in which the element has a score above the predetermined score.

26. The processor readable storage medium of claim 25, wherein the step of retrieving a plurality of electronic documents comprises eliminating extraneous information from the documents that is not related to the text of the documents.

27. The processor readable storage medium of claim 26, wherein, for each document, the step of identifying a plurality of elements comprises determining whether at least one of a plurality of entity names pre-listed in a name catalog appears in the document, the plurality of entity names being pre-categorized in the name catalog based on the plurality of descriptive categories.

28. The processor readable storage medium of claim 27, wherein the step of determining whether at least one of a plurality of entity names pre-listed in the name catalog appears in the document comprises determining whether an alias of at least one of the plurality of entity names appears in the document, the alias being pre-listed along with its associated entity name in the name catalog.

29. The processor readable storage medium of claim 27, wherein the step of identifying each of the plurality of elements comprises identifying at least one entity name by natural language processing.

30. The processor readable storage medium of claim 29, further comprising a step of determining whether the at least one entity name identified by natural language processing should be added to the name catalog.

31. The processor readable storage medium of claim 30, wherein the step of determining whether the at least one entity name identified by natural language processing should be added to the name catalog comprises prompting a user to enter the at least one entity name to the name catalog.

32. The processor readable storage medium of claim 27, wherein the plurality of descriptive categories comprises people, places, products or companies.

33. The processor readable storage medium of claim 26, wherein, for each document, the step of identifying a plurality of elements comprises identifying at least one element by applying a rule-based algorithm to the document to identify the at least one element.

34. The processor readable storage medium of claim 33, wherein the at least one element identified using a rule-based algorithm is categorized according to descriptive categories comprising topics or industries.

35. The processor readable storage medium of claim 25, wherein the step of applying a score to each of the plurality of elements comprises determining a score for each element based on relative position or relative frequency of the element in comparison to other elements in its corresponding document.

36. The processor readable storage medium of claim 25, further comprising a step of grouping the plurality of electronic documents into a plurality of clusters, where the electronic documents in each cluster have at least one common element.

37. The processor readable storage medium of claim 36, further comprising a step of entitling each cluster based on the at least one common element in each cluster.

38. The processor readable storage medium of claim 37, further comprising displaying titles of each cluster and providing corresponding network links to those electronic documents within each cluster.

39. The processor readable storage medium of claim 38, further comprising identifying at least one cluster having the most amount of electronic documents as a top story cluster.

40. The processor readable storage medium of claim 25, further comprising displaying the list of documents in which the element has a score above the predetermined score in a knowledge discovery display.

41. The processor readable storage medium of claim 40, further comprising ordering the list of documents in the knowledge discovery display based on credibility, relevance or recentness.

42. The processor readable storage medium of claim 40, further comprising identifying a plurality other elements that appears in the listed documents besides the element.

43. The processor readable storage medium of claim 42, wherein each of the plurality of other elements is identified based on frequency of appearance in the list of documents or location in each of the documents in the list of documents.

44. The processor readable storage medium of claim 43, further comprising displaying a list of the plurality of other elements in a table of contents section of the knowledge discovery display and providing, for each other element, a network link to another knowledge discovery display relating to the other element.

45. The method of claim 44, wherein the another knowledge discovery display is related to the other element and the element.

46. The processor readable storage medium of claim 44, further comprising ordering the list of the plurality of other elements based on relatedness of each of the plurality of other elements to the element.

47. The processor readable storage medium of claim 25, wherein the informational network is the Internet.

48. The processor readable storage medium of claim 47, wherein the plurality of electronic documents are news articles.

49. A computer-based system for displaying information relating to a plurality of electronic documents available from an informational network, comprising:
   a network interface that communicates with the informational network;
   a document network location information retrieval system that retrieves information relating to location of each of the plurality of documents available on the informational network;
   an element identification system that identifies a plurality of elements in each of the plurality of documents and assigns each of the plurality of elements to a descriptive category selected from a list of descriptive categories;
   an element scoring engine that applies a score to each of the plurality of elements in each of the plurality of documents based on relevance of each of the elements to its corresponding document; and
   a display generator that generates a user interface on a client computer, the user interface displaying at least one of the plurality of documents using the retrieved information relating to the location of the plurality of documents on the informational network in a user interface, the user interface further displaying, for each descriptive category, a list of elements selected from the displayed document that have a score above a predetermined score and providing, for each element in each of the list of elements, a network link to a list of documents in which the element has a score above the predetermined score.

* * * * *